(12) United States Patent
Hamada et al.

(10) Patent No.: US 11,976,839 B2
(45) Date of Patent: May 7, 2024

(54) VENTILATION SYSTEM, AIR-CONDITIONING SYSTEM, AND METHOD OF INSTALLING AIR-CONDITIONING SYSTEM

(71) Applicant: Mitsubishi Electric Corporation, Tokyo (JP)

(72) Inventors: Mamoru Hamada, Tokyo (JP); Shogo Tamaki, Tokyo (JP); So Nomoto, Tokyo (JP); Masato Yosomiya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 884 days.

(21) Appl. No.: 17/045,733

(22) PCT Filed: Apr. 9, 2019

(86) PCT No.: PCT/JP2019/015472
§ 371 (c)(1),
(2) Date: Oct. 6, 2020

(87) PCT Pub. No.: WO2019/230201
PCT Pub. Date: Dec. 5, 2019

(65) Prior Publication Data
US 2021/0025617 A1 Jan. 28, 2021

(30) Foreign Application Priority Data

May 30, 2018 (WO) .................. PCT/JP2018/020765

(51) Int. Cl.
*F24F 11/77* (2018.01)
*F24F 7/007* (2006.01)
(Continued)

(52) U.S. Cl.
CPC .............. *F24F 11/77* (2018.01); *F24F 7/007* (2013.01); *F24F 2009/002* (2013.01); *F24F 2110/12* (2018.01); *F24F 2120/10* (2018.01)

(58) Field of Classification Search
CPC ........ F24F 11/77; F24F 7/007; F24F 2120/10; F24F 2110/12
(Continued)

(56) References Cited

U.S. PATENT DOCUMENTS 4,458,502 A * 7/1984 Adachi .................. F24F 1/0057
62/263
4,711,394 A * 12/1987 Samuel .................. F24F 3/0442
165/209

(Continued)

FOREIGN PATENT DOCUMENTS

CN 102639942 A 8/2012
CN 106123112 A * 11/2016 ................ F24F 1/00
(Continued)

OTHER PUBLICATIONS

International Search Report of the International Searching Authority dated Jul. 31, 2018 for the corresponding international application No. PCT/JP2018/020765 (and English translation).
(Continued)

*Primary Examiner* — Edelmira Bosques
*Assistant Examiner* — Frances F. Hamilton
(74) *Attorney, Agent, or Firm* — POSZ LAW GROUP, PLC

(57) ABSTRACT

A first air-supply port and a first air-exhaust port each disposed in a first zone and used to ventilate the first zone are provided. Further, a second air-supply port and a second air-exhaust port each disposed in a second zone and used to ventilate the second zone are provided, and the second zone is adjacent to the first zone. The first air-supply port, the first
(Continued)

air-exhaust port, the second air-supply port, and the second air-exhaust port are disposed on one plane. The first air-supply port, the first air-exhaust port, the second air-supply port, and the second air-exhaust port are disposed in order of the first air-exhaust port, the first air-supply port, the second air-supply port, and the second air-exhaust port in one direction, or in order of the first air-supply port, the first air-exhaust port, the second air-exhaust port, and the second air-supply port in one direction.

17 Claims, 11 Drawing Sheets

(51) Int. Cl.
  *F24F 9/00* (2006.01)
  *F24F 110/12* (2018.01)
  *F24F 120/10* (2018.01)
(58) Field of Classification Search
  USPC .......................................................... 454/229
  See application file for complete search history.

(56) References Cited

U.S. PATENT DOCUMENTS

| | | | | |
|---|---|---|---|---|
| 5,695,396 | A * | 12/1997 | Markwart | B64D 13/00 454/71 |
| 7,081,049 | B2 * | 7/2006 | Choi | F24F 12/006 454/235 |
| 2005/0287944 | A1 * | 12/2005 | Choi | F24F 12/006 454/234 |
| 2007/0119958 | A1 * | 5/2007 | Kates | F24F 11/77 236/51 |
| 2008/0277486 | A1 * | 11/2008 | Seem | H04L 67/125 236/49.3 |
| 2010/0174414 | A1 * | 7/2010 | Takagi | F24F 3/065 700/278 |
| 2010/0307733 | A1 * | 12/2010 | Karamanos | F24F 11/54 165/254 |
| 2011/0189938 | A1 * | 8/2011 | Yoshii | F24F 11/64 454/256 |
| 2012/0247748 | A1 | 10/2012 | Mise et al. | |
| 2013/0210336 | A1 * | 8/2013 | Ludi | E04B 9/006 454/252 |
| 2015/0204551 | A1 * | 7/2015 | Nair | F24F 11/63 236/49.3 |
| 2016/0359325 | A1 * | 12/2016 | Kawata | H04L 12/2829 |

FOREIGN PATENT DOCUMENTS

| | | | | |
|---|---|---|---|---|
| DE | 1679534 | A1 * | 4/1971 | |
| DE | 1679534 | A1 | 4/1971 | |
| DE | 10301335 | A1 * | 7/2004 | ................ F24F 9/00 |
| EP | 1512921 | A1 * | 3/2005 | ............ F24F 1/0007 |
| EP | 1512921 | A1 | 3/2005 | |
| EP | 2476967 | A1 | 7/2012 | |
| EP | 2476967 | A1 * | 7/2012 | .......... F24F 11/0001 |
| JP | 2013-195047 | A | 9/2013 | |
| JP | 2013195047 | A * | 9/2013 | |
| JP | 2015-114085 | A | 6/2015 | |
| JP | WO-2015079548 | A1 * | 6/2015 | |
| JP | 2015-158313 | A | 9/2015 | |
| JP | 6336269 | B2 * | 6/2018 | |
| KR | 20050104674 | A * | 11/2005 | |
| KR | 20130120604 | A * | 11/2013 | .......... F24F 2120/10 |

OTHER PUBLICATIONS

International Search Report of the International Searching Authority dated Jun. 18, 2019 for the corresponding international application No. PCT/JP2019/015472 (and English translation).
Office Action dated Jun. 15, 2021, issued in corresponding JP Patent Application No. 2020-521761 (and English Machine Translation).
Office Action dated Jun. 22, 2021, issued in corresponding CN Patent Application No. 201980028562.8 (and English Machine Translation).
Extended European Search Report dated Jun. 22, 2021, issued in corresponding European Patent Application No. 19810738.5.

* cited by examiner

VENTILATION SYSTEM, AIR-CONDITIONING SYSTEM, AND METHOD OF INSTALLING AIR-CONDITIONING SYSTEM

CROSS REFERENCE TO RELATED APPLICATIONS

This application is a U.S. national stage application of International Application No. PCT/JP2019/015472 filed on Apr. 9, 2019, which is based on International Application No. PCT/JP2018/020765 filed on May 30, 2018, the contents of which are incorporated herein by reference.

TECHNICAL FIELD

The present disclosure relates to a ventilation system, an air-conditioning system, and a method of installing the air-conditioning system, and more specifically, to a ventilation system, an air-conditioning system, and a method of installing the air-conditioning system, in which ventilation and air conditioning are performed in individual zones.

BACKGROUND ART

As a method of conditioning air in a space such as an office where a plurality of people are present, it has been known that the space is divided into a plurality of zones and air is conditioned in the individual zones so that power consumption is reduced. For example, Patent Literature 1 discloses a proposal that the presence of a person is detected in an air-conditioned zone and in a zone close to the air-conditioned zone, and different air-conditioning operations are performed for a case in which the presence of a person is detected in the air-conditioned zone and for a case in which the presence of a person is detected in the zone close to the air-conditioned zone.

Further, task-ambient air conditioning is also known. In the task-ambient air conditioning, a room is divided into a working area where a person is present and an area other than the working area. The working area and the other area are referred to as "task area" and "ambient area". Air is efficiently conditioned in the task area. For example, Patent Literature 2 discloses a proposal for an air-conditioning system in which each zone includes an ambient air-conditioning area where a radiant cooling panel and an air outlet for introduction of outdoor air and auxiliary cooling are provided, and a task air-conditioning area where a small air-conditioning device is provided for each person at work. In the ambient air-conditioning area of Patent Literature 2, a flow of a cooling medium through the radiant panel and the air quantity of the air outlet are controlled depending on the presence or absence of a person at work in each zone.

CITATION LIST

Patent Literature

Patent Literature 1: Japanese Unexamined Patent Application Publication No. 2015-114085
Patent Literature 2: Japanese Unexamined Patent Application Publication No. 2013-195047

SUMMARY OF INVENTION

Technical Problem

Although the air conditioning or the introduction of outdoor air is controlled in each zone as described in Patent Literature 1 and Patent Literature 2, the power consumption reduction effect decreases because of convection of air between the zones. For example, during cooling, air is conditioned so that the temperature in a zone where a person is present reaches 26 degrees Celsius, and air conditioning is stopped in a zone where no person is present. In this case, air having the temperature of 26 degrees Celsius in the zone where a person is present may flow into the zone where no person is present because of convection of air between the zone where a person is present and the zone where no person is present. Thus, air is conditioned also in the zone where no person is present. As a result, the air conditioning load is not reduced and power consumption cannot be reduced effectively.

The present disclosure has been made to solve the problems described above and has an object to provide a ventilation system, an air-conditioning system, and a method of installing the air-conditioning system, in which convection of air between zones can be reduced and a power consumption reduction effect can be improved.

Solution to Problem

A ventilation system according to an embodiment of the present disclosure includes a first air-supply port and a first air-exhaust port each disposed in a first zone and used to ventilate the first zone, and a second air-supply port and a second air-exhaust port each disposed in a second zone and used to ventilate the second zone, the second zone being adjacent to the first zone. The first air-supply port, the first air-exhaust port, the second air-supply port, and the second air-exhaust port are disposed on one plane. The first air-supply port, the first air-exhaust port, the second air-supply port, and the second air-exhaust port are disposed in order of the first air-exhaust port, the first air-supply port, the second air-supply port, and the second air-exhaust port in one direction, or in order of the first air-supply port, the first air-exhaust port, the second air-exhaust port, and the second air-supply port in one direction.

An air-conditioning system according to another embodiment of the present disclosure includes the ventilation system described above, a first indoor unit disposed in the first zone and configured to condition air in the first zone, and a second indoor unit disposed in the second zone and configured to condition air in the second zone.

A method of installing an air-conditioning system according to still another embodiment of the present disclosure includes disposing a first indoor unit in a first zone, disposing a second indoor unit in a second zone adjacent to the first zone, and disposing a first air-supply port and a first air-exhaust port in the first zone, and a second air-supply port and a second air-exhaust port in the second zone, in such a manner that the first air-supply port, the first air-exhaust port, the second air-supply port, and the second air-exhaust port are disposed on one plane, and the first air-supply port, the first air-exhaust port, the second air-supply port, and the second air-exhaust port are disposed in order of the first air-exhaust port, the first air-supply port, the second air-supply port, and the second air-exhaust port in one direction, or in order of the first air-supply port, the first air-exhaust port, the second air-exhaust port, and the second air-supply port in one direction.

Advantageous Effects of Invention

According to an embodiment of the present disclosure, the first air-exhaust port, the first air-supply port, the second air-supply port, and the second air-exhaust port are disposed in this order in one direction, or the first air-supply port, the first air-exhaust port, the second air-exhaust port, and the second air-supply port are disposed in this order in one direction. Therefore, the convection of air between the zones can be reduced. Thus, unnecessary air conditioning can be reduced and air conditioning can be performed efficiently for each zone. Accordingly, the power consumption reduction effect in the air-conditioning system can be improved.

DESCRIPTION OF EMBODIMENTS

Figure 1:
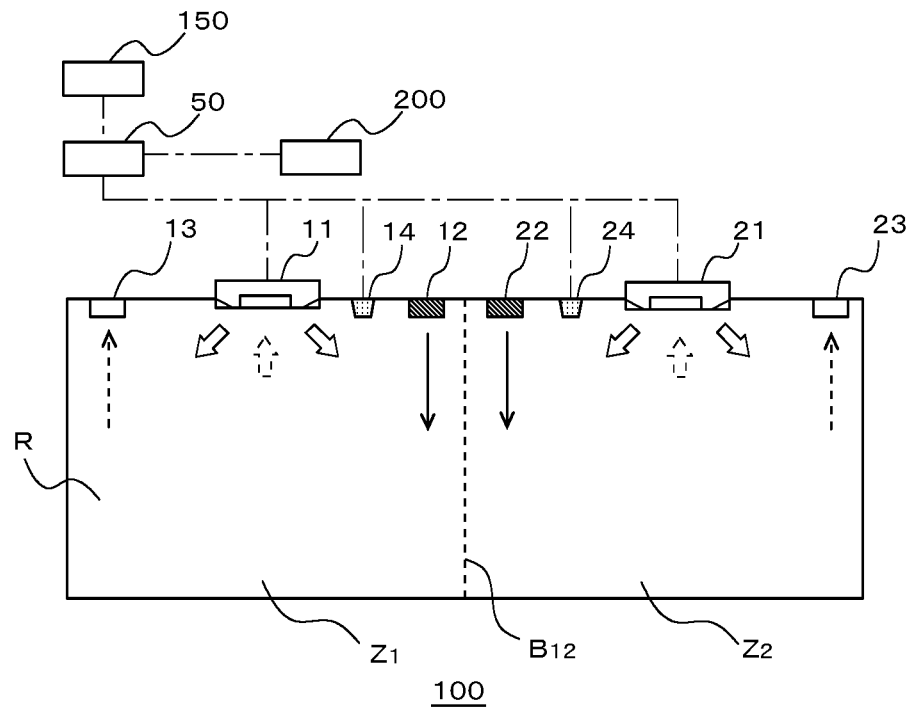
FIG. 1 is a schematic structural diagram of an air-conditioning system according to Embodiment 1.

Embodiments of the present disclosure are described below with reference to the drawings. Note that, in the drawings including FIG. 1 to which reference is made below, the size relationship between constituent elements may differ from an actual size relationship. Further, in the drawings including FIG. 1 to which reference is made below, elements represented by the same reference signs are identical or corresponding elements and are common throughout the description herein. Further, the forms of constituent elements that are defined throughout the description herein are illustrative in all respects and the forms are not limited to those in the description.

Embodiment 1

FIG. 1 is a schematic structural diagram of an air-conditioning system 100 according to Embodiment 1. FIG. 1 is a schematic side view of an air-conditioned space R where air is conditioned by the air-conditioning system 100. The air-conditioning system 100 of Embodiment 1 conditions air in the air-conditioned space R such as a room in an office building, which is divided into a first zone $Z_1$ and a second zone $Z_2$ adjacent to the first zone $Z_1$. The first zone $Z_1$ is a space where air is conditioned by a first indoor unit 11. The second zone $Z_2$ is a space where air is conditioned by a second indoor unit 21. The boundary between the first zone $Z_1$ and the second zone $Z_2$ is referred to as "zone boundary $B_{12}$".

As illustrated in FIG. 1, the air-conditioning system 100 includes the first indoor unit 11 disposed in the first zone $Z_1$ and configured to condition air in the first zone $Z_1$, a first air-supply port 12 and a first air-exhaust port 13 each disposed in the first zone $Z_1$ and used to ventilate the first zone $Z_1$, and a first detection unit 14. The air-conditioning system 100 further includes the second indoor unit 21 disposed in the second zone $Z_2$ and configured to condition air in the second zone $Z_2$, a second air-supply port 22 and a second air-exhaust port 23 each disposed in the second zone $Z_2$ and used to ventilate the second zone $Z_2$, and a second detection unit 24. In Embodiment 1, the first air-supply port 12 and the first air-exhaust port 13 are disposed on the same plane such as a ceiling surface, and the second air-supply port 22 and the second air-exhaust port 23 are also disposed on the same plane such as a ceiling surface.

The air-conditioning system 100 further includes a ventilation device 200 disposed outside the air-conditioned space R and communicating with the first air-supply port 12, the first air-exhaust port 13, the second air-supply port 22, and the second air-exhaust port 23. The air-conditioning system 100 further includes a controller 50 provided in, for example, a control room of a building. The controller 50 receives an operation command for the air-conditioning system 100 via an operation unit 150 that receives an input from a user, and controls the overall air-conditioning system 100 on the basis of operation information specified via the operation unit 150.

Figure 2:
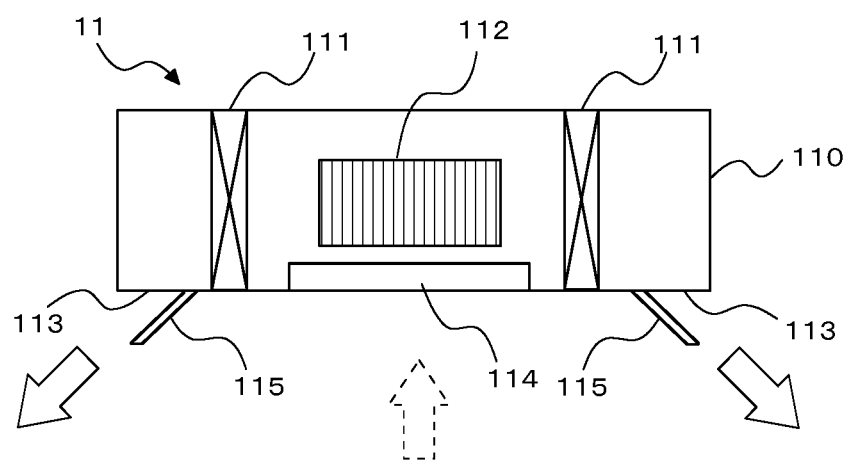
FIG. 2 is a schematic structural diagram of a first indoor unit according to Embodiment 1.

FIG. 2 is a schematic structural diagram of the first indoor unit 11 according to Embodiment 1. Note that the second indoor unit 21 has the same structure as the first indoor unit 11 and the first indoor unit 11 is herein described as a representative. As illustrated in FIG. 2, the first indoor unit 11 includes a casing 110, a heat exchanger 111 and a fan 112, which are disposed in the casing 110. Further, air-conditioning outlets 113 through which conditioned air passing through the heat exchanger 111 is blown out and an air-conditioning inlet 114 through which indoor air is suctioned are provided at the bottom of the casing 110. Further, the air-conditioning outlets 113 are provided with airflow direction flaps 115 configured to adjust directions in which conditioned air is blown out. The first indoor unit 11 cools or heats the first zone $Z_1$ by suctioning indoor air from the air-conditioning inlet 114 by the fan 112, cooling or heating the air by the heat exchanger 111, and blowing the air into the room from the air-conditioning outlets 113.

Figure 3:
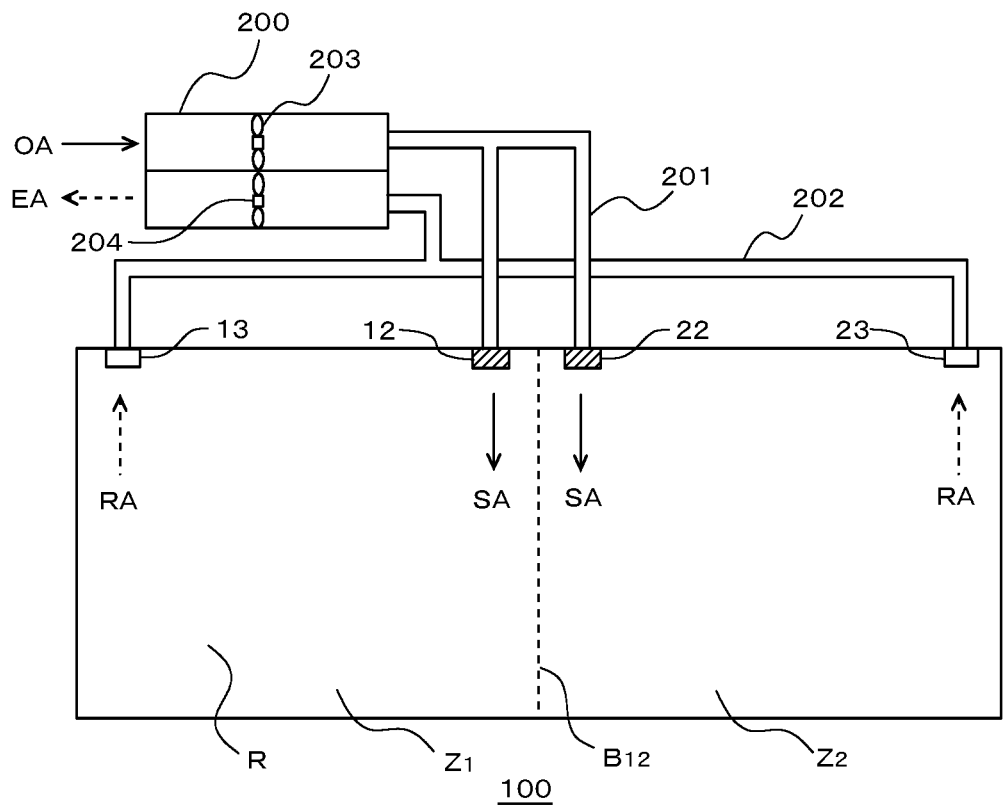
FIG. 3 is a diagram illustrating a ventilation structure of the air-conditioning system according to Embodiment 1.

FIG. 3 is a diagram illustrating a ventilation structure of the air-conditioning system 100 according to Embodiment 1. As illustrated in FIG. 3, the first air-supply port 12 and the second air-supply port 22 are connected to the ventilation device 200 via an air-supply passage 201. The first air-exhaust port 13 and the second air-exhaust port 23 are connected to the ventilation device 200 via an air-exhaust passage 202. In the ventilation device 200, the air-supply passage 201 and the air-exhaust passage 202 are provided independently of each other, an air-supply fan 203 is provided in the air-supply passage 201, and an air-exhaust fan 204 is provided in the air-exhaust passage 202. Although illustration is omitted, the ventilation device 200 may be provided with a total heat exchanger or a sensible heat exchanger configured to exchange heat between indoor air flowing through the air-exhaust passage 202 and outdoor air flowing through the air-supply passage 201. Further, the first air-supply port 12 and the first air-exhaust port 13 may be connected to one ventilation device 200 and the second air-supply port 22 and the second air-exhaust port 23 may be connected to another different ventilation device 200.

Outdoor air (OA) suctioned by the air-supply fan 203 is supplied (SA) to the first zone $Z_1$ from the first air-supply port 12 through the air-supply passage 201 and supplied (SA) to the second zone $Z_2$ from the second air-supply port 22 through the air-supply passage 201. Further, indoor air (RA) suctioned from the first air-exhaust port 13 and the second air-exhaust port 23 by the air-exhaust fan 204 is discharged (EA) to the outside through the air-exhaust passage 202.

The first detection unit 14 includes a human sensor configured to detect a person in the first zone $Z_1$, and an indoor temperature sensor configured to detect an indoor temperature of the first zone $Z_1$. The second detection unit 24 includes a human sensor configured to detect a person in the second zone $Z_2$, and an indoor temperature sensor configured to detect an indoor temperature of the second zone $Z_2$. Detection results from the first detection unit 14 and the second detection unit 24 are output to the controller 50. Examples of the human sensor include an infrared sensor and a camera. The presence of a person in each zone is detected on the basis of a temperature distribution or an image in the zone. Examples of the indoor temperature sensor include an infrared sensor.

Note that the first detection unit 14 and the second detection unit 24 may be installed in the first indoor unit 11 and the second indoor unit 21, respectively. Further, the human sensor and the indoor temperature sensor may be composed of a single infrared sensor or different sensors. Further, a single detection unit may detect people and temperatures in the first zone $Z_1$ and the second zone $Z_2$ without providing the detection units in the first zone $Z_1$ and the second zone $Z_2$, respectively.

The operation unit 150 receives an action of specifying operation information related to, for example, an operation mode, a temperature setting, a humidity setting, an air-quantity setting, and an airflow-direction setting in the air-conditioning system 100. Examples of the operation mode of the air-conditioning system 100 include a cooling operation, a heating operation, an air-sending operation, and a ventilation operation. The operation unit 150 is a remote control provided to the air-conditioning system 100. Alternatively, the operation unit 150 may be a smartphone, a mobile phone, a personal digital assistant (PDA), a personal computer, or a tablet.

Figure 4:
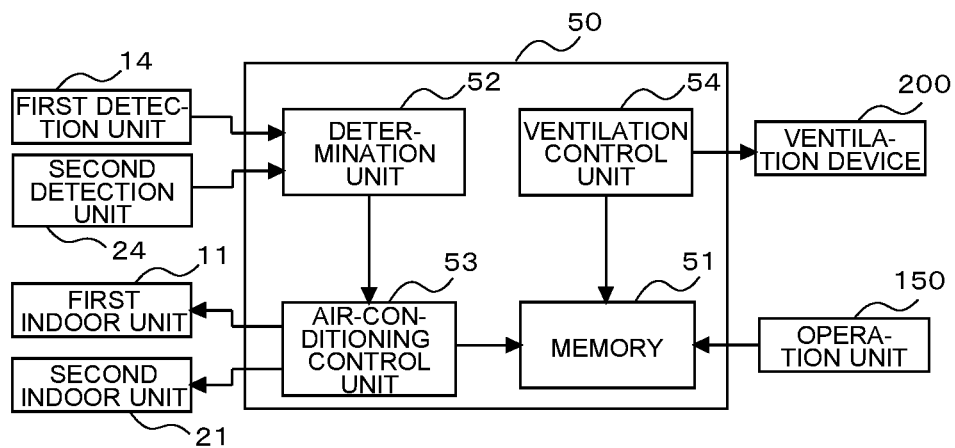
FIG. 4 is a functional block diagram of a controller according to Embodiment 1.

FIG. 4 is a functional block diagram of the controller 50 according to Embodiment 1. As illustrated in FIG. 4, the controller 50 includes a memory 51, a determination unit 52, an air-conditioning control unit 53, and a ventilation control unit 54 as functional units. The controller 50 is dedicated hardware or a central processing unit (CPU; referred to also as "central processing device", "processing device", "computing device", "microprocessor", "microcomputer", or "processor") configured to execute programs stored in a memory (not illustrated). If the controller 50 is dedicated hardware, examples of the controller 50 include a single circuit, a complex circuit, an application specific integrated circuit (ASIC), a field-programmable gate array (FPGA), and any combinations of the examples. The functional units of the controller 50 may be composed of individual hardware devices or by a single hardware device.

If the controller 50 is a CPU, the functions to be executed by the controller 50 are composed of software, firmware, or a combination of software and firmware. The software or firmware is described as a program and stored in the memory. The CPU implements the functions of the controller 50 by reading and executing programs stored in the memory. For example, the memory is a RAM, a ROM, a flash memory, an EPROM, an EEPROM, or any other non-volatile or volatile semiconductor memory. Note that a subset of the functions of the controller 50 may be implemented by dedicated hardware and the other subset may be implemented by software or firmware.

The memory 51 stores details of a command input by the user via the operation unit 150. Specifically, the memory 51 stores an operation mode, a temperature setting, a humidity setting, an air-quantity setting, and an airflow-direction setting in the air-conditioning system 100. Note that the memory 51 need not essentially be included in the controller 50 but may be a memory provided separately from the controller 50.

The determination unit 52 commands, on the basis of detection results from the first detection unit 14 and the second detection unit 24, the air-conditioning control unit 53 to perform an air-conditioning operation in a zone where a person is detected, and to stop an air-conditioning operation and perform an air-sending operation in a zone where no person is detected. Specifically, the determination unit 52 commands the air-conditioning control unit 53 to set the air-conditioning operation for the first indoor unit 11 when the first detection unit 14 detects a person in the first zone $Z_1$, and to set the air-sending operation for the first indoor unit 11 when no person is detected. Similarly, the determination unit 52 commands the air-conditioning control unit 53 to set the air-conditioning operation for the second indoor unit 21 when the second detection unit 24 detects a person in the second zone $Z_2$, and to set the air-sending operation for the second indoor unit 21 when no person is detected. Note that the air-conditioning operation is the cooling operation or the heating operation.

The air-conditioning control unit 53 controls the first indoor unit 11 and the second indoor unit 21 on the basis of details of commands from the determination unit 52 and details of commands stored in the memory 51. Specifically, when the determination unit 52 commands the air-conditioning control unit 53 to set the air-conditioning operation for the first indoor unit 11, the air-conditioning control unit 53 controls the first indoor unit 11 so that the indoor temperature detected by the first detection unit 14 reaches a set temperature stored in the memory 51. In this case, the air-conditioning control unit 53 controls, for example, an air quantity of the fan 112 of the first indoor unit 11, and an operation frequency of a compressor and an opening degree of an expansion valve in an outdoor unit (not illustrated) connected to the first indoor unit 11.

Further, when the determination unit 52 commands the air-conditioning control unit 53 to set the air-sending operation for the first indoor unit 11, the air-conditioning control unit 53 stops a flow of refrigerant into the heat exchanger 111 of the first indoor unit 11 and continues driving of the fan 112. When the determination unit 52 commands the air-conditioning control unit 53 to set the air-conditioning operation or the air-sending operation for the second indoor unit 21, the air-conditioning control unit 53 performs control similar to the control for the first indoor unit 11.

The ventilation control unit 54 controls the ventilation device 200 on the basis of details of a command stored in the memory 51. Specifically, the ventilation control unit 54 controls air quantities of the air-supply fan 203 and the air-exhaust fan 204 of the ventilation device 200.

Figure 5:
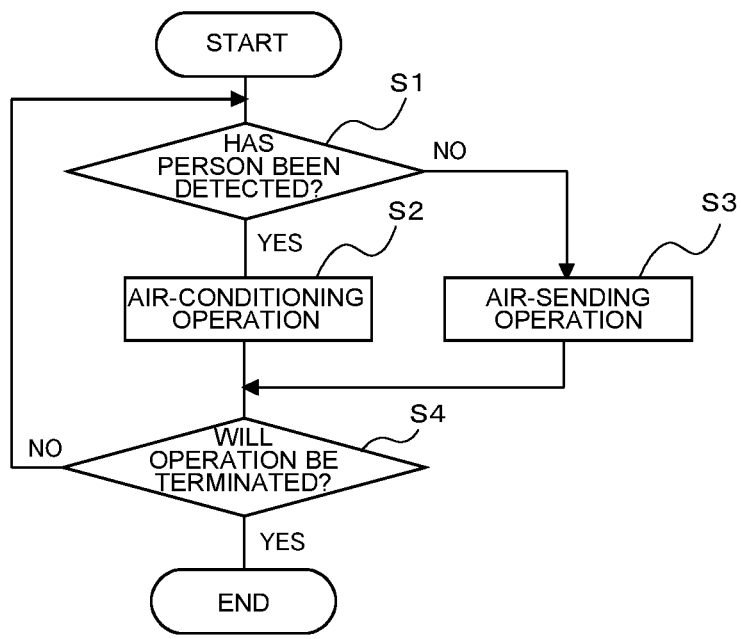
FIG. 5 illustrates an operation flow of the air-conditioning system according to Embodiment 1.

FIG. 5 illustrates an operation flow of the air-conditioning system 100 according to Embodiment 1. This operation flow is executed for each zone by the controller 50. First, determination is made whether a person is detected in a zone (S1). When a person is detected (S1: YES), the air-conditioning operation is performed on the basis of details of a command stored in the memory 51 (S2). When the air-conditioning operation has already been performed, the operation is continued. When the air-conditioning operation has been stopped, the operation is resumed. When no person is detected (S1: NO), on the other hand, the air-sending operation is performed (S3).

Then, determination is made whether the operation of the air-conditioning system 100 will be terminated (S4). When the operation is terminated (S4: YES), the operation of the air-conditioning system 100 is stopped and this process is terminated. When the operation is not terminated (S4: NO), on the other hand, the process returns to Step S1 and the subsequent process is repeated.

As described above, in Embodiment 1, the air-conditioning operation is performed only when a person is present in a zone, and the air-sending operation is performed when no person is present. Thus, power consumption can be reduced without a loss of comfort. Although the air conditioning is controlled for each zone, the power consumption reduction effect decreases when convection of air occurs between the zones. To solve the problem, the air-conditioning system 100 of Embodiment 1 has a structure in which the convection of air between the zones is reduced. Thus, the power consumption reduction effect is improved.

Figure 6:
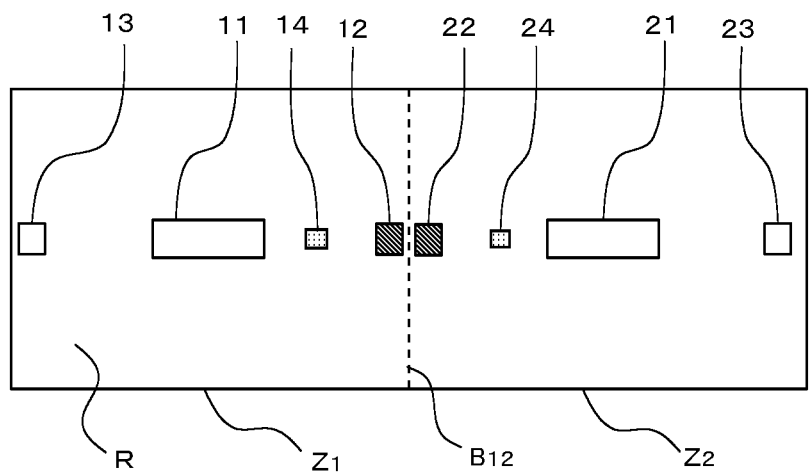
FIG. 6 is a diagram illustrating planar disposition of components of the air-conditioning system according to Embodiment 1.

Description is made of the structure in which the convection of air between the zones is reduced in the air-conditioning system 100 of Embodiment 1. FIG. 6 is a diagram illustrating planar disposition of the components of the air-conditioning system 100 according to Embodiment 1. As illustrated in FIG. 6, the first indoor unit 11 is disposed at the center of the first zone $Z_1$ and the second indoor unit 21 is disposed at the center of the second zone $Z_2$. The first air-supply port 12 and the second air-supply port 22 are each disposed close to the zone boundary $B_{12}$. Further, the first air-supply port 12 and the second air-supply port 22 are close to each other. The first air-exhaust port 13 is disposed opposite the first air-supply port 12 across the first indoor unit 11. The second air-exhaust port 23 is disposed opposite the second air-supply port 22 across the second indoor unit 21.

As illustrated in FIG. 6, in Embodiment 1, the position of the first air-supply port 12 in the first zone $Z_1$ and the position of the second air-supply port 22 in the second zone $Z_2$ are symmetrical across the zone boundary $B_{12}$, which is the boundary between the first zone $Z_1$ and the second zone $Z_2$. Further, the position of the first air-exhaust port 13 in the first zone $Z_1$ and the position of the second air-exhaust port 23 in the second zone $Z_2$ are symmetrical across the zone boundary $B_{12}$. Note that the term "symmetrical" herein includes not only complete symmetry but also substantial symmetry. Further, in Embodiment 1, the first air-supply port 12, the first air-exhaust port 13, the second air-supply port 22, and the second air-exhaust port 23 are disposed in order of the first air-exhaust port 13, the first air-supply port 12, the second air-supply port 22, and the second air-exhaust port 23 in one direction. Further, the distance between the first air-supply port 12 and the first air-exhaust port 13 is shorter than the distance between the first air-supply port 12 and the second air-exhaust port 23, and the distance between the second air-supply port 22 and the second air-exhaust port 23 is shorter than the distance between the second air-supply port 22 and the first air-exhaust port 13.

Figure 7:
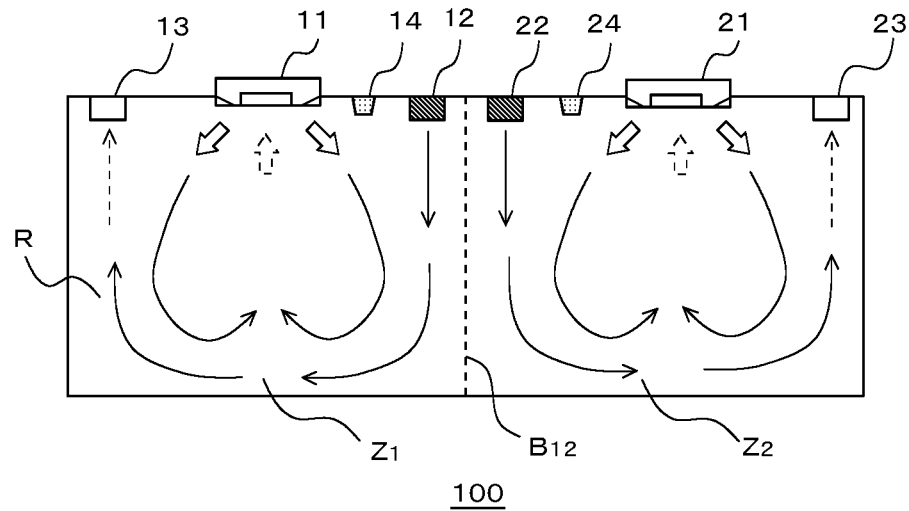
FIG. 7 is a schematic diagram illustrating flows of air in the air-conditioning system of Embodiment 1.

FIG. 7 is a schematic diagram illustrating flows of air in the air-conditioning system 100 of Embodiment 1. As illustrated in FIG. 7, air blown out from the first air-supply port 12 is suctioned into the first air-exhaust port 13, and air blown out from the second air-supply port 22 is suctioned into the second air-exhaust port 23. As both the air-supply port and the air-exhaust port are disposed in each zone, the convection of air between the zones can be reduced and the flows of air can be confined within each zone in comparison with, for example, a case in which the air-supply port is disposed only in the first zone $Z_1$ and the air-exhaust port is disposed only in the second zone $Z_2$.

If both the air-supply port and the air-exhaust port are disposed in each zone but, for example, the first air-supply port 12 and the second air-exhaust port 23 are disposed close to the zone boundary $B_{12}$, air blown out from the first air-supply port 12 is suctioned into the second air-exhaust port 23, which is close to the first air-supply port 12. Thus, the flows of air are not confined within each zone and convection occurs between the zones. In contrast, in Embodiment 1, the distance between the air-supply port and the air-exhaust port in each zone is made shorter than the distance from the air-exhaust port or the air-supply port in the adjacent zone. Thus, air can be supplied and discharged within the zone and the flows of air can be confined within the zone.

Further, air is supplied with the first air-supply port 12 and the second air-supply port 22 disposed close to the zone boundary $B_{12}$. Thus, a flow of air from the other zone can be reduced similarly to a case in which an air curtain is provided. As a result, in the air-conditioning system 100 of Embodiment 1, the convection of air between the first zone $Z_1$ and the second zone $Z_2$ can be reduced and the power consumption reduction effect can be improved.

Figure 8:
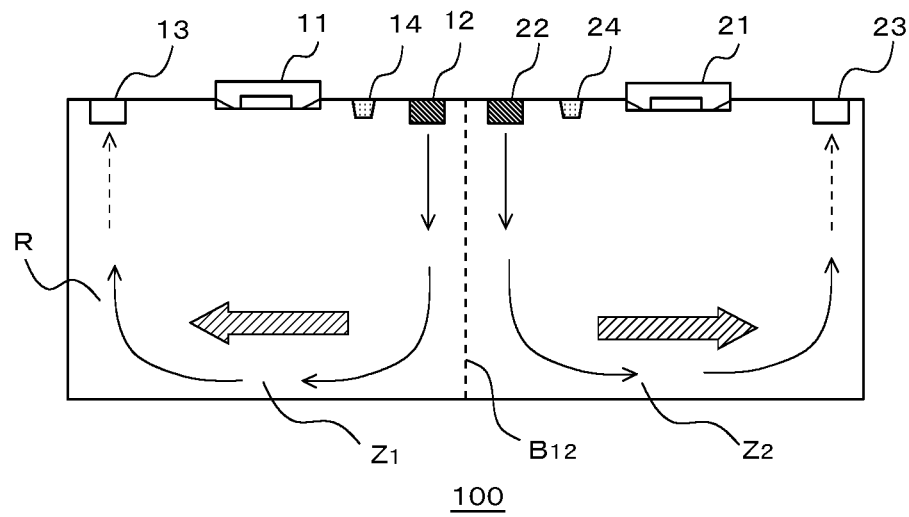
FIG. 8 is a schematic diagram illustrating ventilation airflows in the air-conditioning system of Embodiment 1.

FIG. 8 is a schematic diagram illustrating ventilation airflows in the air-conditioning system 100 of Embodiment 1. The first air-supply port 12 and the first air-exhaust port 13 are disposed on the same horizontal plane, and the second air-supply port 22 and the second air-exhaust port 23 are also disposed on the same horizontal plane. Therefore, horizontal airflows shown by thick arrows in FIG. 8 are generated in the zones. Thus, the entire zones can be ventilated efficiently. Note that the first air-supply port 12, the first air-exhaust port 13, the second air-supply port 22, and the second air-exhaust port 23 may be disposed flush with the ceiling surface. Thus, projection into the space can be reduced and the space can be used effectively. Further, design is improved.

Embodiment 2

An air-conditioning system 100A according to Embodiment 2 is described. Embodiment 2 differs from Embodiment 1 in that air-supply quantities or air-exhaust quantities of the first air-supply port 12, the first air-exhaust port 13, the second air-supply port 22, and the second air-exhaust port 23 are adjusted depending on whether a person is present in each zone.

Figure 9:
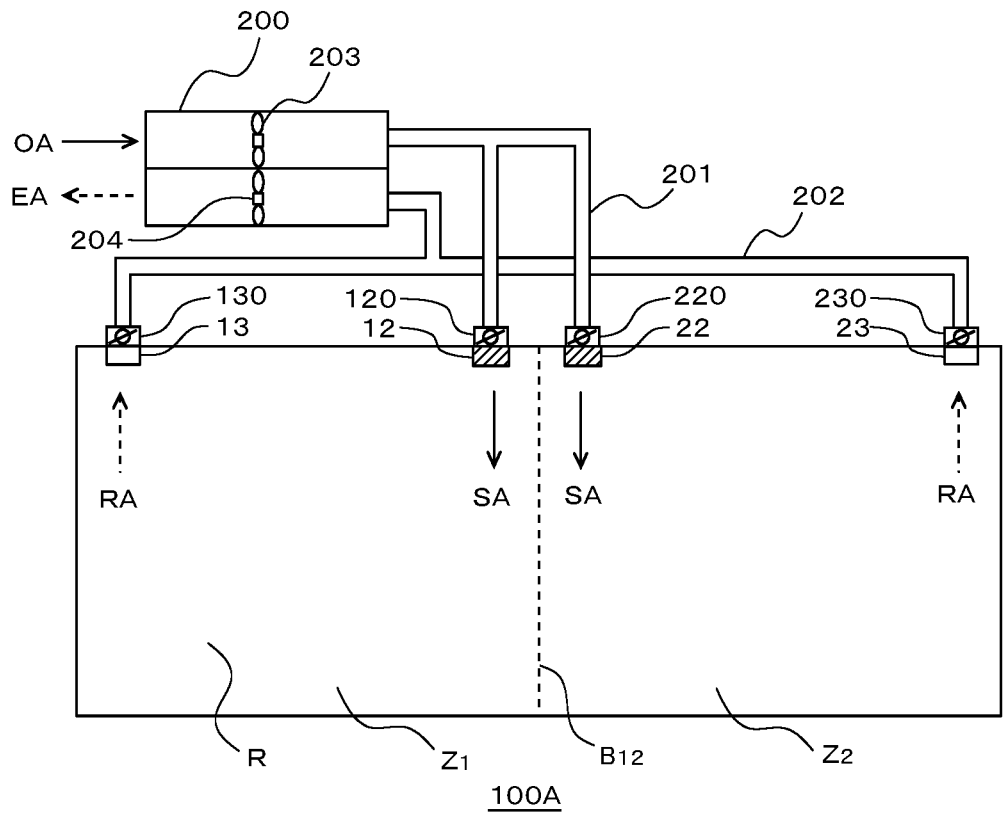
FIG. 9 is a diagram illustrating a ventilation structure of an air-conditioning system according to Embodiment 2.

FIG. 9 is a diagram illustrating a ventilation structure of the air-conditioning system 100A according to Embodiment 2. As illustrated in FIG. 9, in the air-supply passage 201, a first air-supply quantity adjustment unit 120 is provided upstream of the first air-supply port 12, and a second air-supply quantity adjustment unit 220 is provided upstream of the second air-supply port 22. Further, in the air-exhaust passage 202, a first air-exhaust quantity adjustment unit 130 is provided downstream of the first air-exhaust port 13, and a second air-exhaust quantity adjustment unit 230 is provided downstream of the second air-exhaust port 23.

The first air-supply quantity adjustment unit 120 adjusts the quantity of air to be supplied to the first zone $Z_1$ from the first air-supply port 12. The second air-supply quantity adjustment unit 220 adjusts the quantity of air to be supplied to the second zone $Z_2$ from the second air-supply port 22. The first air-exhaust quantity adjustment unit 130 adjusts the quantity of air to be discharged from the first air-exhaust port 13. The second air-exhaust quantity adjustment unit 230 adjusts the quantity of air to be discharged from the second air-exhaust port 23. Examples of the first air-supply quantity adjustment unit 120, the second air-supply quantity adjustment unit 220, the first air-exhaust quantity adjustment unit 130, and the second air-exhaust quantity adjustment unit 230 include a damper to be driven by a motor. The air-supply quantity or the air-exhaust quantity is adjusted by controlling the opening degree of vanes of the damper by the controller 50.

Figure 10:
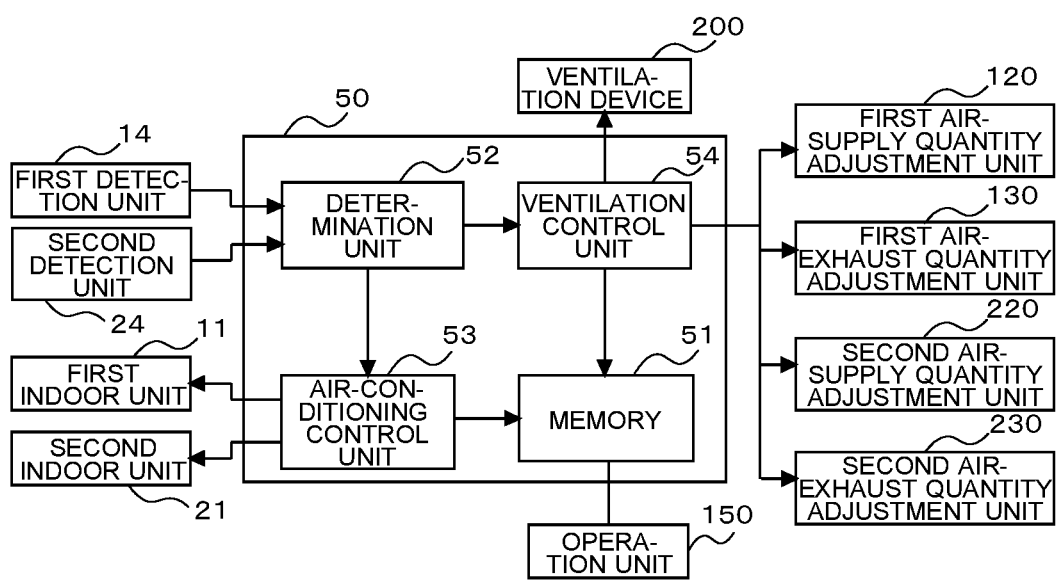
FIG. 10 is a functional block diagram of a controller according to Embodiment 2.

FIG. 10 is a functional block diagram of the controller 50 according to Embodiment 2. The determination unit 52 of Embodiment 2 commands, on the basis of detection results from the first detection unit 14 and the second detection unit 24, the air-conditioning control unit 53 to condition air in a zone where a person is detected, and to stop conditioning and sending air in a zone where no person is detected. Specifically, the determination unit 52 commands the air-conditioning control unit 53 to set the air-conditioning operation for the first indoor unit 11 when the first detection unit 14 detects a person in the first zone $Z_1$, and to stop the first indoor unit 11 when no person is detected. Similarly, the determination unit 52 commands the air-conditioning control unit 53 to set the air-conditioning operation for the second indoor unit 21 when the second detection unit 24 detects a person in the second zone $Z_2$, and to stop the second indoor unit 21 when no person is detected.

Further, the determination unit 52 commands, on the basis of detection results from the first detection unit 14 and the second detection unit 24, the ventilation control unit 54 to ventilate the zone where a person is detected, and to stop ventilating the zone where no person is detected. Specifically, the determination unit 52 commands the ventilation control unit 54 to ventilate the first zone $Z_1$ when the first detection unit 14 detects a person in the first zone $Z_1$, and to stop ventilating the first zone $Z_1$ when no person is detected. Similarly, the determination unit 52 commands the ventilation control unit 54 to ventilate the second zone $Z_2$ when a person is detected in the second zone $Z_2$, and to stop ventilating the second zone $Z_2$ when no person is detected.

The air-conditioning control unit 53 controls the first indoor unit 11 and the second indoor unit 21 on the basis of details of commands from the determination unit 52 and details of commands stored in the memory 51. Specifically, when the determination unit 52 commands the air-conditioning control unit 53 to set the air-conditioning operation for the first indoor unit 11, the air-conditioning control unit 53 controls the first indoor unit 11 similarly to Embodiment 1. Further, when the determination unit 52 commands the air-conditioning control unit 53 to stop the first indoor unit 11, the air-conditioning control unit 53 stops a flow of refrigerant into the heat exchanger 111 of the first indoor unit 11 and stops the fan 112. When the determination unit 52 commands the air-conditioning control unit 53 to set the air-conditioning operation for the second indoor unit 21 or to stop the second indoor unit 21, the air-conditioning control unit 53 performs control similar to the control for the first indoor unit 11.

The ventilation control unit 54 controls the ventilation device 200 on the basis of details of a command stored in the memory 51. Further, the ventilation control unit 54 controls the first air-supply quantity adjustment unit 120, the first air-exhaust quantity adjustment unit 130, the second air-supply quantity adjustment unit 220, and the second air-exhaust quantity adjustment unit 230 on the basis of details of a command from the determination unit 52. Specifically, when the determination unit 52 commands the ventilation control unit 54 to ventilate the first zone $Z_1$, the ventilation control unit 54 controls the opening degrees of the first air-supply quantity adjustment unit 120 and the first air-exhaust quantity adjustment unit 130 so that the air-supply quantity of the first air-supply port 12 and the air-exhaust quantity of the first air-exhaust port 13 reach predetermined air quantities. At this time, the ventilation control unit 54 controls the first air-supply quantity adjustment unit 120 and the first air-exhaust quantity adjustment unit 130 so that the air-supply quantity of the first air-supply port 12 and the air-exhaust quantity of the first air-exhaust port 13 reach the same air quantity.

Further, when the determination unit 52 commands the ventilation control unit 54 to stop ventilating the first zone $Z_1$, the ventilation control unit 54 controls the opening degrees of the first air-supply quantity adjustment unit 120 and the first air-exhaust quantity adjustment unit 130 so that the air-supply quantity of the first air-supply port 12 and the air-exhaust quantity of the first air-exhaust port 13 reach 0. Further, when the determination unit 52 commands the ventilation control unit 54 to ventilate or stop ventilating the second zone $Z_2$, the ventilation control unit 54 controls the second air-supply quantity adjustment unit 220 and the second air-exhaust quantity adjustment unit 230 similarly to the control for the first air-supply quantity adjustment unit 120 and the first air-exhaust quantity adjustment unit 130.

Figure 11:
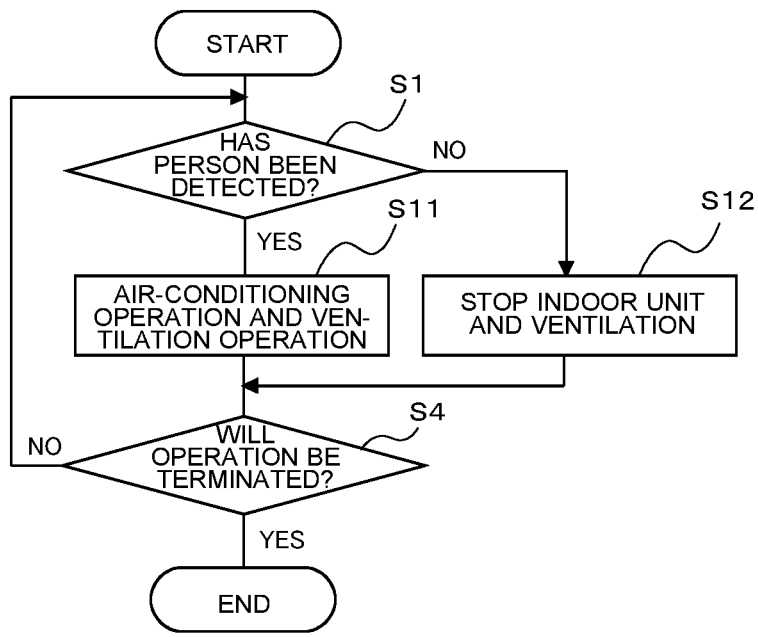
FIG. 11 illustrates an operation flow of the air-conditioning system according to Embodiment 2.

FIG. 11 illustrates an operation flow of the air-conditioning system 100A according to Embodiment 2. This operation flow is executed for each zone by the controller 50. First, determination is made whether a person is detected in a zone (S1). When a person is detected (S1: YES), the air-conditioning operation and the ventilation operation are performed on the basis of details of commands stored in the memory 51 (S11). When the air-conditioning operation and the ventilation operation have already been performed, the operations are continued. When the air-conditioning operation and the ventilation operation have been stopped, the operations are resumed.

When no person is detected (S1: NO), on the other hand, the indoor unit and the ventilation operation are stopped (S12). Then, determination is made whether the operation of the air-conditioning system 100A will be terminated (S4). When the operation is terminated (S4: YES), the operation of the air-conditioning system 100A is stopped and this process is terminated. When the operation is not terminated (S4: NO), on the other hand, the process returns to Step S1 and the subsequent process is repeated.

Figure 12:
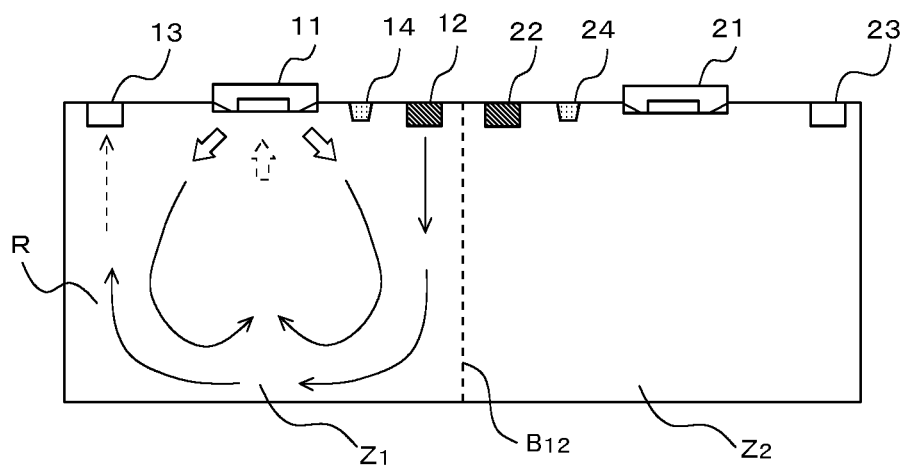
FIG. 12 is a schematic diagram illustrating flows of air in the air-conditioning system of Embodiment 2.

FIG. 12 is a schematic diagram illustrating flows of air in the air-conditioning system 100A of Embodiment 2. FIG. 12 illustrates flows of air in a case in which no person is detected in the second zone $Z_2$. In Embodiment 2 as well, the air-conditioning operation is performed only when a person is present in a zone, and the air conditioning and the air sending are stopped when no person is present. Thus, power consumption can be reduced without a loss of comfort. Further, the flows of air can be confined within each zone and the power consumption reduction effect can be improved similarly to Embodiment 1.

Further, the air-supply quantity and the air-exhaust quantity in each zone are set to the same air quantity during ventilation. Thus, the convection of air between the zones can be reduced. Further, the ventilation of the second zone $Z_2$ where no person is detected is stopped. Thus, during the cooling operation, high-temperature outdoor air can be prevented from flowing into the second zone $Z_2$ and an increase in the temperature in the second zone $Z_2$ can be reduced. Further, during the heating operation, low-temperature outdoor air can be prevented from flowing into the second zone $Z_2$ and a decrease in the temperature in the second zone $Z_2$ can be reduced. As the temperature increase or the temperature decrease is reduced in the zone where no person is present, an increase in an air conditioning load can be reduced even if air flows from the zone where no person is present. As a result, the power consumption reduction effect can further be improved.

Embodiment 3

An air-conditioning system 100B of Embodiment 3 is described. Embodiment 3 differs from Embodiment 2 in that ventilation is performed or stopped depending on an outdoor temperature.

Figure 13:
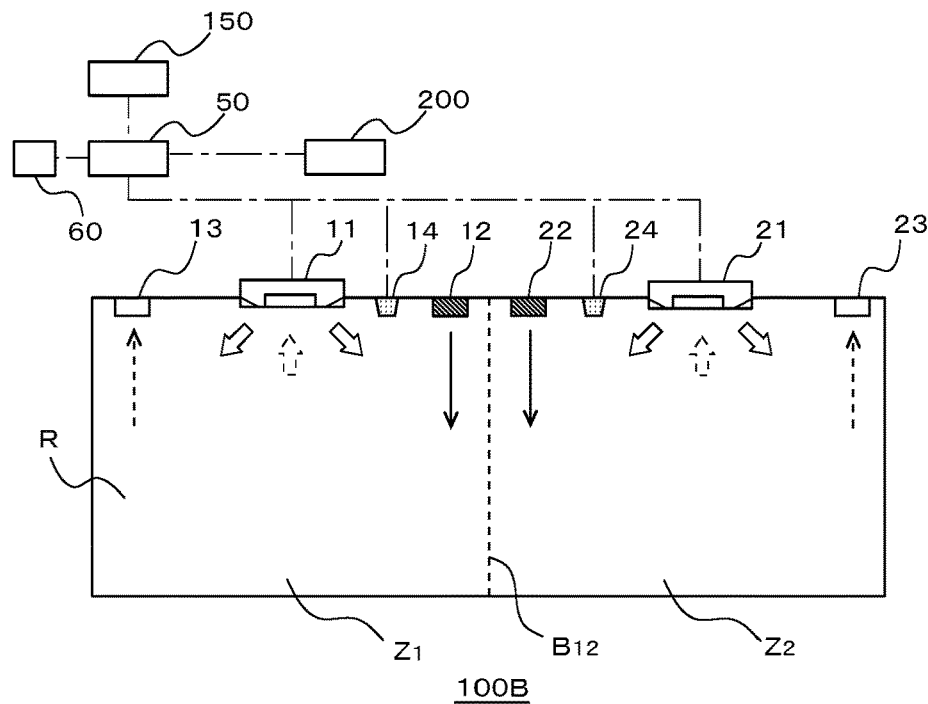
FIG. 13 is a schematic structural diagram of an air-conditioning system according to Embodiment 3.

FIG. 13 is a schematic structural diagram of the air-conditioning system 100b according to Embodiment 3. The air-conditioning system 100B of Embodiment 3 further includes an outdoor temperature sensor 60 configured to detect an outdoor temperature outside the air-conditioned space R. The outdoor temperature sensor 60 may be installed in the outdoor unit connected to the first indoor unit 11 or the second indoor unit 21, or may be disposed in the air-supply passage 201 of the ventilation device 200. The outdoor temperature detected by the outdoor temperature sensor 60 is output to the controller 50.

Figure 14:
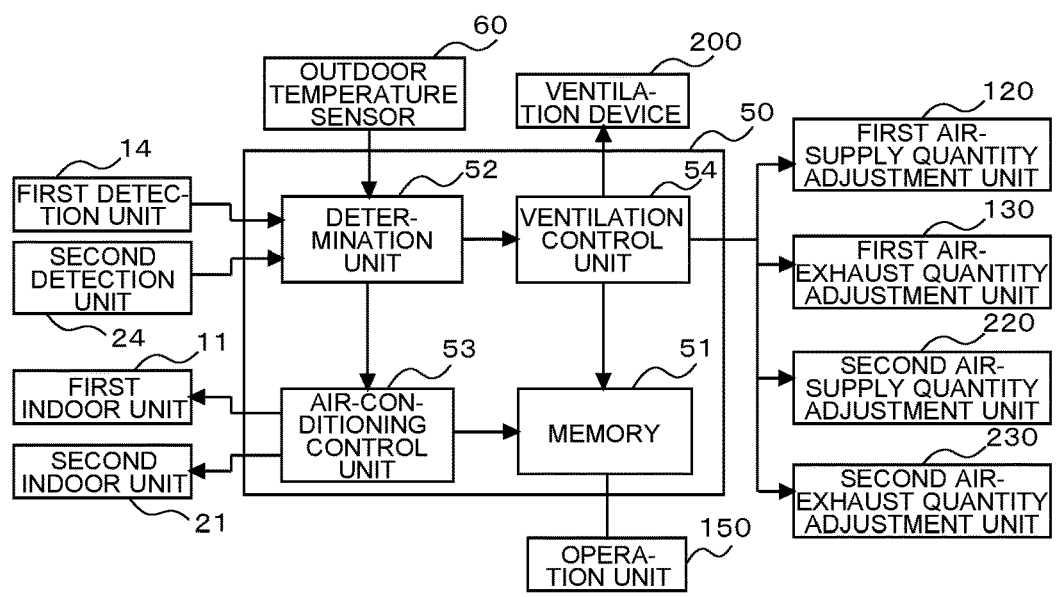
FIG. 14 is a functional block diagram of a controller according to Embodiment 3.

FIG. 14 is a functional block diagram of the controller 50 according to Embodiment 3. When the first indoor unit 11 and the second indoor unit 21 perform the cooling operation, the determination unit 52 of Embodiment 3 commands the ventilation control unit 54 to perform or stop ventilation depending on the outdoor temperature detected by the outdoor temperature sensor 60. Specifically, the determination unit 52 commands, similarly to Embodiment 2, the air-conditioning control unit 53 and the ventilation control unit 54 to set the air-conditioning operation as the first indoor operation and ventilate the first zone $Z_1$ when a person is detected in the first zone $Z_1$.

Further, the determination unit 52 commands the air-conditioning control unit 53 to stop the first indoor unit 11 when no person is detected in the first zone $Z_1$. Further, the determination unit 52 commands the ventilation control unit 54 to ventilate the first zone $Z_1$ when the stopped first indoor unit 11 performed the cooling operation before the stop and when the outdoor temperature is lower than the indoor temperature. Further, the determination unit 52 commands the ventilation control unit 54 to stop ventilating the first zone $Z_1$ when the stopped first indoor unit 11 did not perform the cooling operation before the stop (for example, performed the heating operation) or when the outdoor temperature is higher than or equal to the indoor temperature. The determination unit 52 controls the second zone $Z_2$ similarly to the control for the first zone $Z_1$.

Similarly to Embodiment 2, the air-conditioning control unit 53 controls the first indoor unit 11 and the second indoor unit 21 on the basis of details of commands from the determination unit 52 and details of commands stored in the memory 51. Similarly to Embodiment 2, the ventilation control unit 54 controls the first air-supply quantity adjustment unit 120, the first air-exhaust quantity adjustment unit 130, the second air-supply quantity adjustment unit 220, and the second air-exhaust quantity adjustment unit 230 on the basis of details of a command from the determination unit 52.

Figure 15:
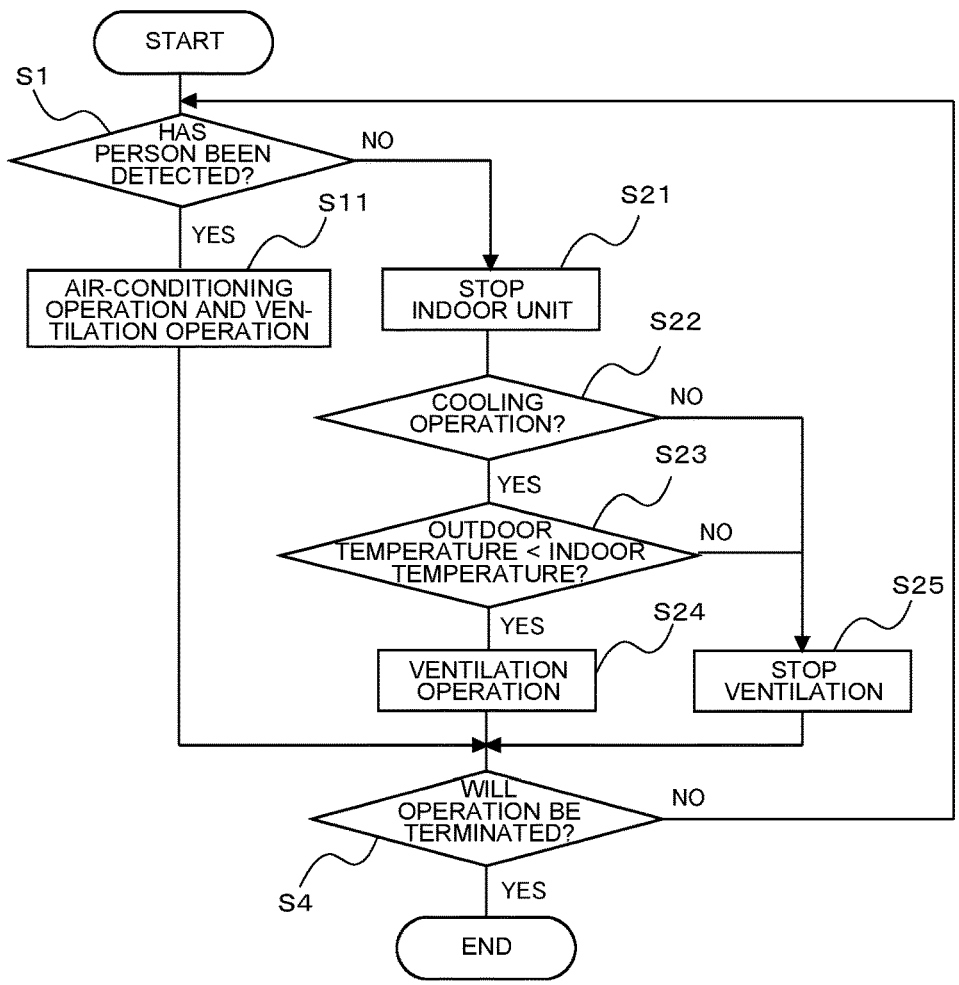
FIG. 15 illustrates an operation flow of the air-conditioning system according to Embodiment 3.

FIG. 15 illustrates an operation flow of the air-conditioning system 100 according to Embodiment 3. This operation flow is executed for each zone by the controller 50. First, determination is made whether a person is detected in a zone (S1). When a person is detected (S1: YES), the air-conditioning operation and the ventilation operation are performed on the basis of details of commands stored in the memory 51 (S11). When the air-conditioning operation and the ventilation operation have already been performed, the operations are continued. When the air-conditioning operation and the ventilation operation have been stopped, the operations are resumed.

When no person is detected in the zone (S1: NO), on the other hand, the indoor unit is stopped (S21). After the indoor unit is stopped, determination is made whether the operation mode of the indoor unit was the cooling operation before the stop (S22). When the operation mode was the cooling operation (S22: YES), determination is made whether the outdoor temperature is lower than the indoor temperature (S23). When the outdoor temperature is lower than the indoor temperature (S23: YES), the ventilation operation is performed (S24).

When the operation mode of the indoor unit was not the cooling operation before the stop (S22: NO) or when the outdoor temperature is higher than or equal to the indoor temperature (S23: NO), on the other hand, the ventilation is stopped (S25). Then, determination is made whether the operation of the air-conditioning system 100B will be terminated (S4). When the operation is terminated (S4: YES), the operation of the air-conditioning system 100 is stopped and this process is terminated. When the operation is not terminated (S4: NO), on the other hand, the process returns to Step S1 and the subsequent process is repeated.

Figure 16:
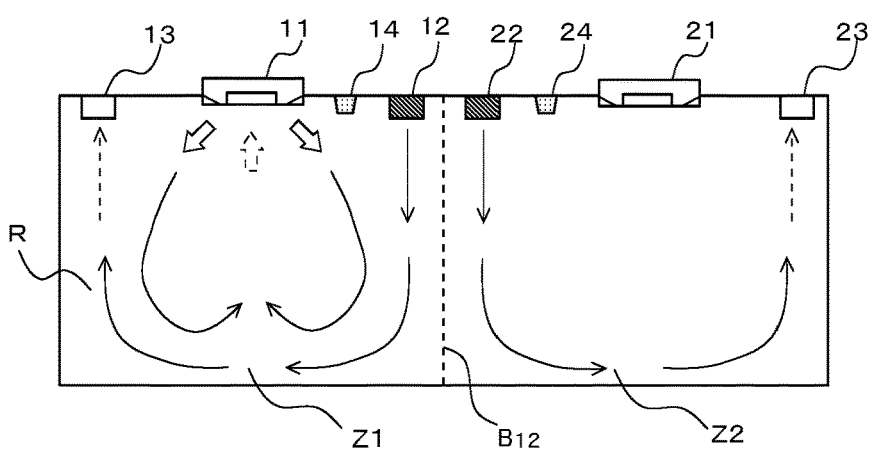
FIG. 16 is a schematic diagram illustrating flows of air in the air-conditioning system of Embodiment 3.

FIG. 16 is a schematic diagram illustrating flows of air in the air-conditioning system 100B of Embodiment 3. FIG. 16 illustrates flows of air in a case in which no person is detected in the second zone $Z_2$, the second indoor unit 21 performed the cooling operation, and the outdoor temperature is lower than the indoor temperature. In Embodiment 3 as well, the air-conditioning operation is performed depending on whether a person is present in a zone similarly to Embodiment 2. Thus, power consumption can be reduced without a loss of comfort. Further, the convection of air between the zones can be reduced and the power consumption reduction effect can be improved.

Further, when the first indoor unit 11 and the second indoor unit 21 perform the cooling operation and when the outdoor temperature is lower than the indoor temperature, ventilation is desirable because an outdoor-air cooling effect is obtained and the power consumption reduction effect is obtained. The outdoor-air cooling effect is herein a cooling effect obtained by supplying low-temperature outdoor air into the room. In Embodiment 3, during a cooling operation in which the outdoor temperature is lower than the indoor temperature, the outdoor-air cooling effect can be obtained by performing the ventilation operation. Thus, the power consumption reduction effect can be improved throughout a year.

Embodiment 4

An air-conditioning system 100 of Embodiment 4 is described. Embodiment 4 differs from Embodiment 3 in that ventilation air quantities are controlled depending on the number of people in each zone.

In Embodiment 4, the first detection unit 14 and the second detection unit 24 detect the presence of people and also detect the number of people. Note that a human-count detection sensor may separately be provided to detect the number of people on the basis of a $CO_2$ concentration in each zone. The determination unit 52 commands the ventilation control unit 54 to change the ventilation air quantities depending on the detected number of people. The ventilation air quantities are the air-supply quantity of the first air-supply port 12 and the air-exhaust quantity of the first air-exhaust port 13, or the air-supply quantity of the second air-supply port 22 and the air-exhaust quantity of the second air-exhaust port 23.

Specifically, the determination unit 52 commands, similarly to Embodiment 2, the air-conditioning control unit 53 to set the air-conditioning operation as the first indoor operation when a person is detected in the first zone $Z_1$. Further, the determination unit 52 commands the ventilation control unit 54 to ventilate the first zone $Z_1$ at the maximum air quantities when the operating first indoor unit 11 is performing the cooling operation and when the outdoor temperature is lower than the indoor temperature. Further, the determination unit 52 commands the ventilation control unit 54 to ventilate the first zone $Z_1$ at air quantities that depend on the detected number of people when the operating first indoor unit 11 is not performing the cooling operation (for example, performing the heating operation) or when the outdoor temperature is higher than or equal to the indoor temperature.

Further, the determination unit 52 commands the air-conditioning control unit 53 to stop the first indoor unit 11 when no person is detected in the first zone $Z_1$. Further, the determination unit 52 commands the ventilation control unit 54 to ventilate the first zone $Z_1$ at the maximum air quantities when the stopped first indoor unit 11 performed the cooling operation before the stop and when the outdoor temperature is lower than the indoor temperature. Further, the determination unit 52 commands the ventilation control unit 54 to stop ventilating the first zone $Z_1$ when the stopped first indoor unit 11 did not perform the cooling operation before the stop (for example, performed the heating operation) or when the outdoor temperature is higher than or equal to the indoor temperature. The determination unit 52 controls the second zone $Z_2$ similarly to the control for the first zone $Z_1$.

Similarly to Embodiment 2, the air-conditioning control unit 53 controls the first indoor unit 11 and the second indoor unit 21 on the basis of details of commands from the determination unit 52 and details of commands stored in the memory 51.

The ventilation control unit 54 controls the first air-supply quantity adjustment unit 120, the first air-exhaust quantity adjustment unit 130, the second air-supply quantity adjustment unit 220, and the second air-exhaust quantity adjustment unit 230 on the basis of details of a command from the determination unit 52. Specifically, when the determination unit 52 commands the ventilation control unit 54 to ventilate the first zone $Z_1$ at the maximum air quantities, the ventilation control unit 54 controls the opening degrees of the first air-supply quantity adjustment unit 120 and the first air-exhaust quantity adjustment unit 130 so that the air-supply quantity of the first air-supply port 12 and the air-exhaust quantity of the first air-exhaust port 13 reach their maximum values.

Further, when the determination unit 52 commands the ventilation control unit 54 to ventilate the first zone $Z_1$ at air quantities that depend on the detected number of people, the ventilation control unit 54 controls the opening degrees of the first air-supply quantity adjustment unit 120 and the first air-exhaust quantity adjustment unit 130 so that the air-supply quantity of the first air-supply port 12 and the air-exhaust quantity of the first air-exhaust port 13 are proportional to the number of people. Specifically, the opening degrees of the first air-supply quantity adjustment unit 120 and the first air-exhaust quantity adjustment unit 130 are controlled so that the air-supply quantity of the first air-supply port 12 and the air-exhaust quantity of the first air-exhaust port 13 increase as the number of people increases, and the air-supply quantity of the first air-supply port 12 and the air-exhaust quantity of the first air-exhaust port 13 decrease as the number of people decreases. At this time, the ventilation control unit 54 controls the first air-supply quantity adjustment unit 120 and the first air-exhaust quantity adjustment unit 130 so that the air-supply quantity of the first air-supply port 12 and the air-exhaust quantity of the first air-exhaust port 13 reach the same air quantity. Alternatively, the ventilation control unit 54 may control the opening degrees of the first air-supply quantity adjustment unit 120 and the first air-exhaust quantity adjustment unit 130 so that the air-supply quantity and the air-exhaust quantity increase or decrease stepwise depending on the number of people. The second air-supply quantity adjustment unit 220 and the second air-exhaust quantity adjustment unit 230 are controlled similarly to the control for the first air-supply quantity adjustment unit 120 and the first air-exhaust quantity adjustment unit 130.

Figure 17:
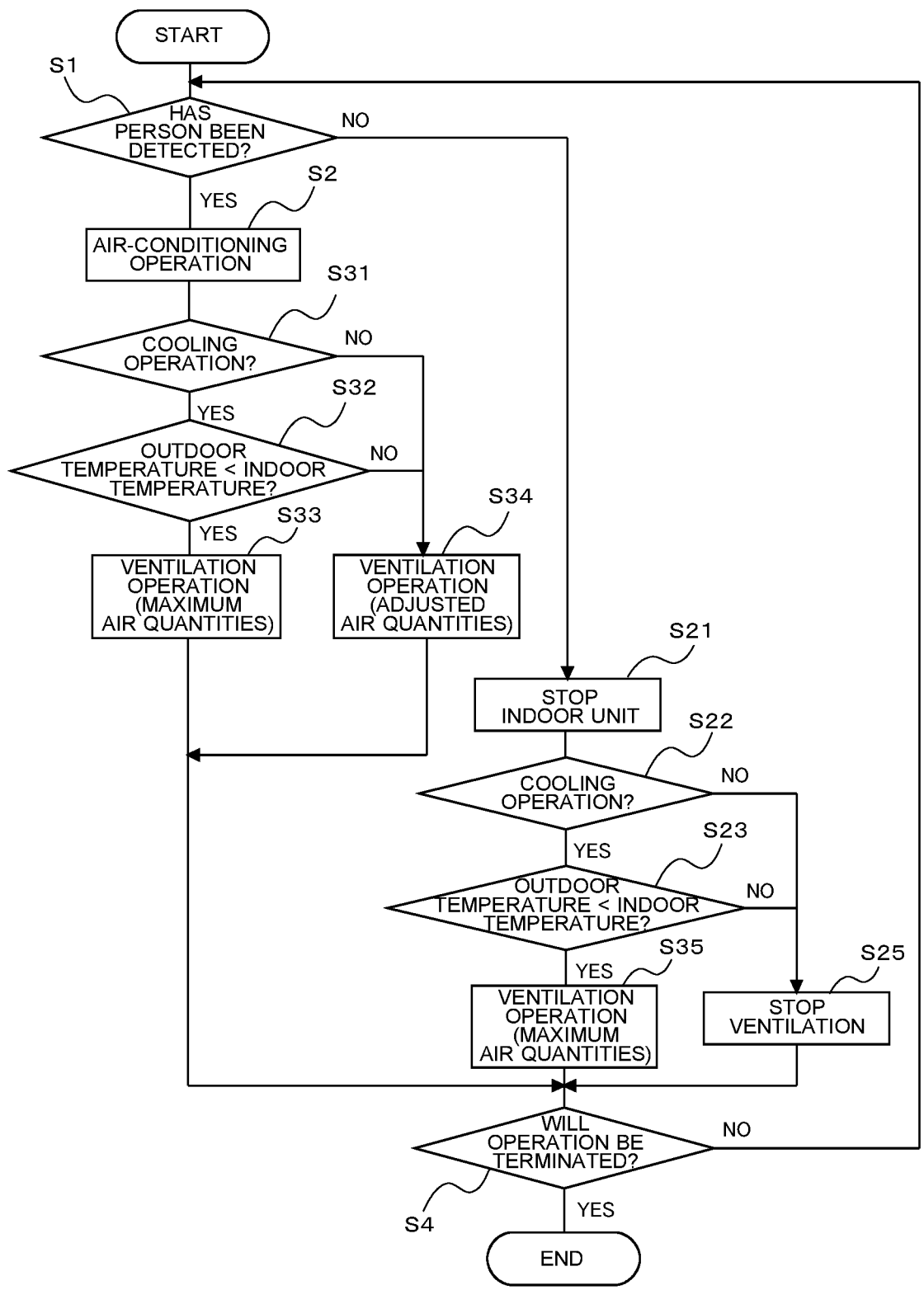
FIG. 17 illustrates an operation flow of an air-conditioning system according to Embodiment 4.

FIG. 17 illustrates an operation flow of the air-conditioning system 100 according to Embodiment 4. This operation flow is executed for each zone by the controller 50. First, determination is made whether a person is detected in a zone (S1). When a person is detected (S1: YES), the air-conditioning operation is performed on the basis of details of a command stored in the memory 51 (S2). When the air-conditioning operation has already been performed, the operation is continued. When the air-conditioning operation has been stopped, the operation is resumed.

Then, determination is made whether the air-conditioning operation is the cooling operation (S31). When the air-conditioning operation is the cooling operation (S31: YES), determination is made whether the outdoor temperature is lower than the indoor temperature (S32). When the outdoor temperature is lower than the indoor temperature (S32: YES), the ventilation operation is performed at the maximum air quantities (S33). When the air-conditioning operation is not the cooling operation (S31: NO) or when the outdoor temperature is higher than or equal to the indoor temperature (S32: NO), the ventilation operation is performed at air quantities adjusted depending on the number of people in the zone (S34).

When no person is detected in the zone (S1: NO), on the other hand, the indoor unit is stopped (S21). After the indoor unit is stopped, determination is made whether the operation mode of the indoor unit was the cooling operation before the stop (S22). When the operation mode was the cooling operation (S22: YES), determination is made whether the outdoor temperature is lower than the indoor temperature (S23). When the outdoor temperature is lower than the indoor temperature (S23: YES), the ventilation operation is performed at the maximum air quantities (S35).

When the operation mode of the indoor unit was not the cooling operation before the stop (S22: NO) or when the outdoor temperature is higher than or equal to the indoor temperature (S23: NO), on the other hand, the ventilation is stopped (S25). Then, determination is made whether the operation of the air-conditioning system 100 will be terminated (S4). When the operation is terminated (S4: YES), the operation of the air-conditioning system 100 is stopped and this process is terminated. When the operation is not terminated (S4: NO), on the other hand, the process returns to Step S1 and the subsequent process is repeated.

In Embodiment 4 as well, the convection of air between the zones can be reduced, the power consumption reduction effect can be improved, and the outdoor-air cooling effect can be obtained in the zone where no person is detected similarly to Embodiment 3. Even in the zone where a person is detected, the outdoor-air cooling effect can be obtained during the cooling operation. Thus, the air conditioning load is reduced and power consumption is reduced. Further, during an operation other than the cooling operation, the ventilation load can be reduced and power consumption can further be reduced when the ventilation air quantities in the zone where a person is detected are set to minimum air quantities that depend on the number of people.

Figure 18:
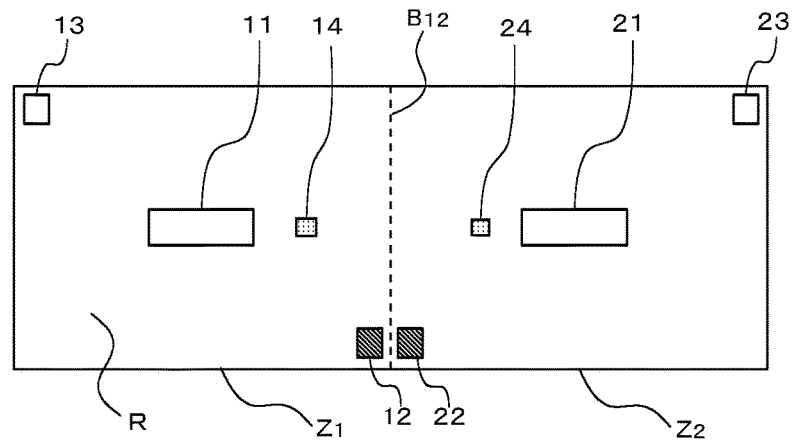
FIG. 18 is a diagram illustrating planar disposition of components of an air-conditioning system according to Modified Example 1.

Although the embodiments of the present disclosure are described above with reference to the drawings, the specific structure of the present disclosure is not limited to the structures of the embodiments and may be modified without departing from the spirit of the disclosure. For example, the disposition of the first air-supply port 12, the first air-exhaust port 13, the second air-supply port 22, and the second air-exhaust port 23 is not limited to the disposition in the example of FIG. 6. FIG. 18 is a diagram illustrating planar disposition of components of an air-conditioning system 100C according to Modified Example 1. As illustrated in FIG. 18, the first air-supply port 12, the first air-exhaust port 13, the second air-supply port 22, and the second air-exhaust port 23 may be disposed at corners of the individual zones. Also in this case, the position of the first air-supply port 12 and the position of the second air-supply port 22 are symmetrical across the zone boundary $B_{12}$, and the position of the first air-exhaust port 13 and the position of the second air-exhaust port 23 are symmetrical across the zone boundary $B_{12}$. Also in the disposition illustrated in FIG. 18, the distance between the first air-supply port 12 and the first air-exhaust port 13 is shorter than the distance between the first air-supply port 12 and the second air-exhaust port 23, and the distance between the second air-supply port 22 and the second air-exhaust port 23 is shorter than the distance between the second air-supply port 22 and the first air-exhaust port 13. Thus, the airflows can be confined within each zone.

Although the first air-supply port 12 and the second air-supply port 22 are disposed close to the zone boundary $B_{12}$ in FIG. 6 and FIG. 18, the first air-exhaust port 13 and the second air-exhaust port 23 may be disposed close to the zone boundary $B_{12}$. Specifically, in FIG. 6, the first air-exhaust port 13, the first air-supply port 12, the second air-supply port 22, and the second air-exhaust port 23 are disposed in this order in one direction, but the first air-supply port 12, the first air-exhaust port 13, the second air-exhaust port 23, and the second air-supply port 22 may be disposed in this order in one direction. That is, the airflows can be confined within each zone by disposing the air-supply ports or the air-exhaust ports close to the zone boundary $B_{12}$.

Figure 19:
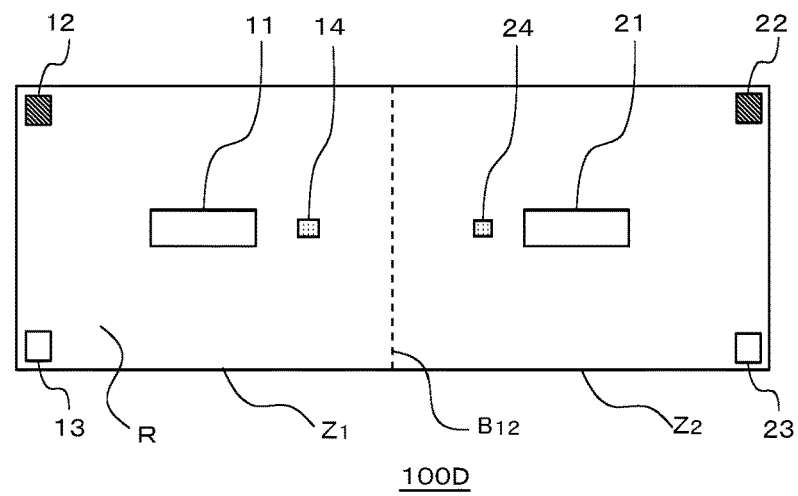
FIG. 19 is a diagram illustrating planar disposition of components of an air-conditioning system according to Modified Example 2.

Further, the first air-supply port 12, the first air-exhaust port 13, the second air-supply port 22, and the second air-exhaust port 23 may be disposed away from the zone boundary $B_{12}$. FIG. 19 is a diagram illustrating planar disposition of components of an air-conditioning system 100D according to Modified Example 2. As illustrated in FIG. 19, the first air-supply port 12 and the first air-exhaust port 13 in Modified Example 2 are disposed at ends of the first zone $Z_1$ that are opposite to the zone boundary $B_{12}$. Further, the second air-supply port 22 and the second air-exhaust port 23 are disposed at ends of the second zone $Z_2$ that are opposite to the zone boundary $B_{12}$. Further, the position of the first air-supply port 12 and the position of the second air-supply port 22 are symmetrical across the zone boundary $B_{12}$, and the position of the first air-exhaust port 13 and the position of the second air-exhaust port 23 are symmetrical across the zone boundary $B_{12}$.

Also in the disposition illustrated in FIG. 19, the distance between the first air-supply port 12 and the first air-exhaust port 13 is shorter than the distance between the first air-supply port 12 and the second air-exhaust port 23, and the distance between the second air-supply port 22 and the second air-exhaust port 23 is shorter than the distance between the second air-supply port 22 and the first air-exhaust port 13. Therefore, air blown out from the first air-supply port 12 is suctioned into the first air-exhaust port 13, and air blown out from the second air-supply port 22 is suctioned into the second air-exhaust port 23. Thus, the flows of air can be confined within each zone. As a result, the convection of air between the first zone $Z_1$ and the second zone $Z_2$ can be reduced and the power consumption reduction effect can be improved.

Figure 20:
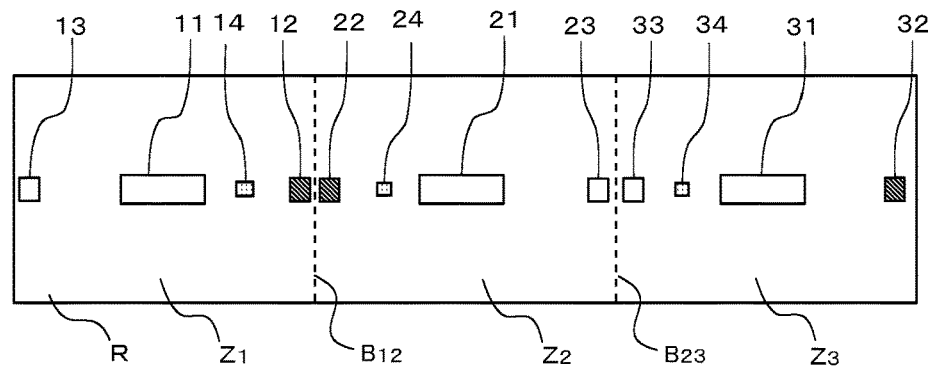
FIG. 20 is a diagram illustrating planar disposition of components of an air-conditioning system according to Modified Example 3.

Further, the air-conditioned space R need not essentially be divided into two zones, but may be divided into three or more zones. FIG. 20 is a diagram illustrating planar disposition of components of an air-conditioning system 100E according to Modified Example 3. As illustrated in FIG. 20, in Modified Example 3, the air-conditioned space R is divided into three zones, and air conditioning and ventilation are performed for each zone. The air-conditioning system 100E of Modified Example 3 further includes a third indoor unit 31 disposed in a third zone $Z_3$ adjacent to the second zone $Z_2$ and configured to condition air in the third zone $Z_3$, and a third air-supply port 32 and a third air-exhaust port 33 each disposed in the third zone $Z_3$ and used to ventilate the third zone $Z_3$.

Disposition of the components in the first zone $Z_1$ and the second zone $Z_2$ is the same as the disposition in Embodiment 1 illustrated in FIG. 6. Further, as illustrated in FIG. 20, the third indoor unit 31 is disposed at the center of the third zone $Z_3$. Further, the second air-exhaust port 23 and the third air-exhaust port 33 are close to each other and close to a zone boundary $B_{23}$ between the second zone $Z_2$ and the third zone $Z_3$. Further, the third air-supply port 32 is disposed opposite the third air-exhaust port 33 across the third indoor unit 31.

Further, as illustrated in FIG. 20, the position of the second air-supply port 22 in the second zone $Z_2$ and the position of the third air-supply port 32 in the third zone $Z_3$ are symmetrical across the zone boundary $B_{23}$. Further, the position of the second air-exhaust port 23 in the second zone $Z_2$ and the position of the third air-exhaust port 33 in the third zone $Z_3$ are symmetrical across the zone boundary $B_{23}$. Note that the term "symmetrical" herein includes not only complete symmetry but also substantial symmetry. Further, the distance between the second air-supply port 22 and the second air-exhaust port 23 is shorter than the distance between the second air-supply port 22 and the third air-exhaust port 33, and the distance between the third air-supply port 32 and the third air-exhaust port 33 is shorter than the distance between the third air-supply port 32 and the second air-exhaust port 23. As a result, the convection of air between the first zone $Z_1$ and the second zone $Z_2$ can be reduced and the power consumption reduction effect can be improved.

Figure 21:
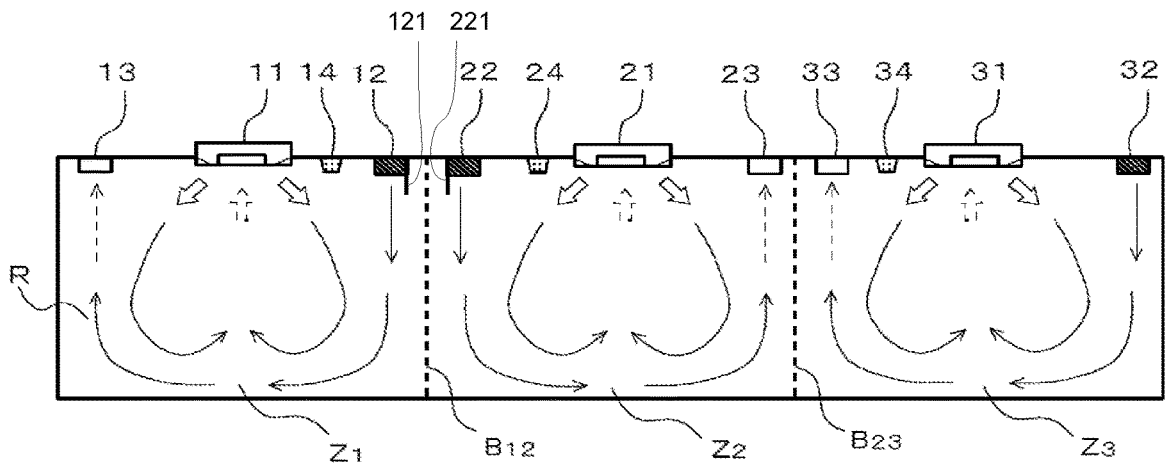
FIG. 21 is a schematic diagram illustrating flows of air in the air-conditioning system of Modified Example 3.

FIG. 21 is a schematic diagram illustrating flows of air in the air-conditioning system 100E of Modified Example 3. Flows of air in the first zone $Z_1$ and the second zone $Z_2$ are the same as the flows of air in Embodiment 1 illustrated in FIG. 7. Further, as illustrated in FIG. 21, air blown out from the third air-supply port 32 is suctioned into the third air-exhaust port 33. As both the air-supply port and the air-exhaust port are disposed in each zone even when the number of zones increases, the convection of air between the zones can be reduced and the flows of air can be confined within each zone. Further, the distance between the air-supply port and the air-exhaust port in each zone is made shorter than the distance from the air-exhaust port or the air-supply port in the adjacent zone. Thus, air can be supplied and discharged within the zone, the flows of air can be confined within the zone, and the power consumption reduction effect can be improved.

Although the first indoor unit 11, the first air-supply port 12, and the first air-exhaust port 13 are disposed in the ceiling of the air-conditioned space R in the embodiments described above, the disposition of the first indoor unit 11, the first air-supply port 12, and the first air-exhaust port 13 is not limited to the dispositions in the embodiments described above. The first indoor unit 11, the first air-supply port 12, and the first air-exhaust port 13 may be disposed on a floor or wall of the air-conditioned space R depending on, for example, an environment in the room. The same applies to the second indoor unit 21, the second air-supply port 22, and the second air-exhaust port 23. Also in this case, it is only required that the distance between the first air-supply port 12 and the first air-exhaust port 13 be shorter than the distance between the first air-supply port 12 and the second air-exhaust port 23, and the distance between the second air-supply port 22 and the second air-exhaust port 23 be shorter than the distance between the second air-supply port 22 and the first air-exhaust port 13.

Further, airflow directions of conditioned air to be blown out from the indoor units, supply airflow directions of the air-supply ports, or discharge airflow directions of the air-exhaust ports may be adjusted to reduce the convection of air between the zones in the air-conditioning system 100. Specifically, the air-conditioning control unit 53 may control the airflow direction flaps 115 of the first indoor unit 11 so that the conditioned air does not flow into the second zone $Z_2$ when no person is present in the second zone $Z_2$.

Further, at least one of the first air-supply port 12 and the first air-exhaust port 13 may be provided with a first airflow-direction adjustment unit 121, and at least one of the second air-supply port 22 and the second air-exhaust port 23 may be provided with a second airflow-direction adjustment unit 221. Examples of the first airflow-direction adjustment unit 121 and the second airflow-direction adjustment unit 221 include an airflow direction flap. The first airflow-direction adjustment unit 121 makes adjustment in such a manner that at least one of the supply airflow direction of the first air-supply port 12 and the discharge airflow direction of the first air-exhaust port 13 is deflected away from the second zone $Z_2$. Further, the second airflow-direction adjustment unit 221 makes adjustment in such a manner that at least one of the supply airflow direction of the second air-supply port 22 and the discharge airflow direction of the second air-exhaust port 23 is deflected away from the first zone $Z_1$. The first airflow-direction adjustment unit 121 and the second airflow-direction adjustment unit 221 may manually be adjusted and fixed when the airflow-direction adjustment units are disposed, or may be controlled by the controller 50 depending on whether a person is present in the adjacent zone.

Figure 22:
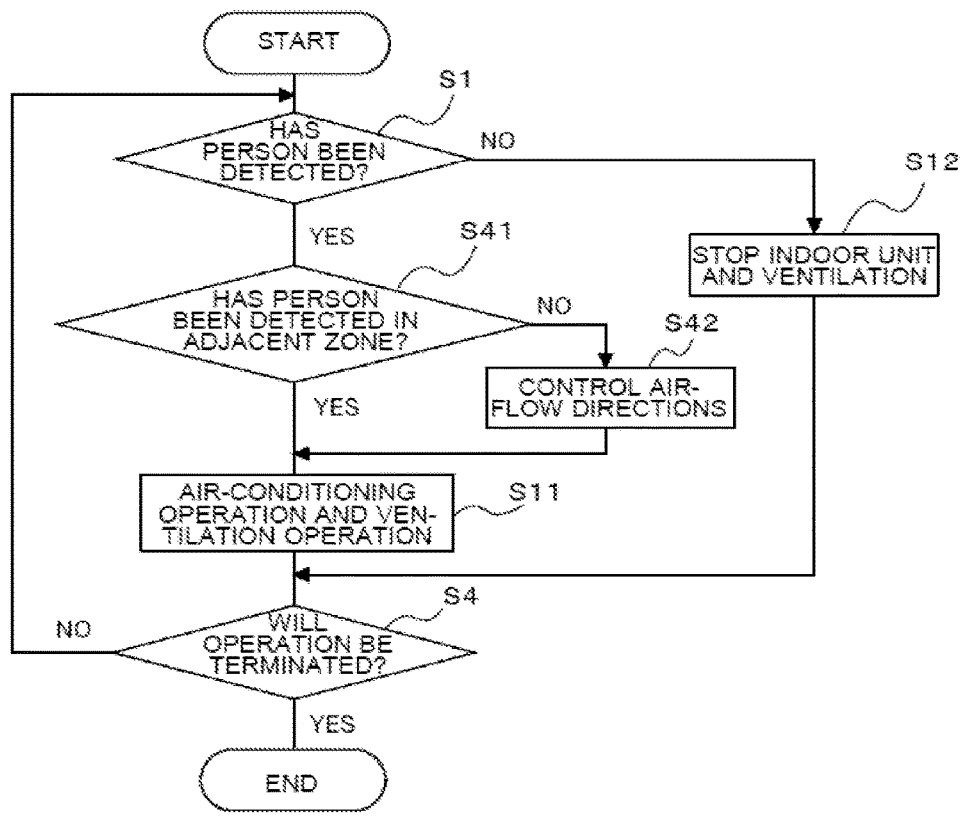
FIG. 22 illustrates an operation flow of an air-conditioning system according to Modified Example 4.

FIG. 22 illustrates an operation flow of an air-conditioning system 100 according to Modified Example 4. This operation flow is executed for each zone by the controller 50. First, determination is made whether a person is detected in a zone (S1). When a person is detected (S1: YES), determination is made whether a person is detected in the adjacent zone (S41). When no person is detected in the adjacent zone (S41: NO), the airflow directions of the indoor unit and the ventilation are controlled (S42).

Specifically, when a person is detected in the first zone $Z_1$ and no person is detected in the second zone $Z_2$, the controller 50 controls the airflow direction flaps 115 in such a manner that the blowing airflow directions of the first indoor unit 11 are deflected away from the second zone $Z_2$. Further, when a person is detected in the first zone $Z_1$ and no person is detected in the second zone $Z_2$, the controller 50 controls the first airflow-direction adjustment unit 121 in such a manner that the supply airflow direction of the first air-supply port 12 and the discharge airflow direction of the first air-exhaust port 13 are deflected away from the second zone $Z_2$. The second zone $Z_2$ is controlled similarly.

Then, the air-conditioning operation and the ventilation operation are performed on the basis of details of commands stored in the memory 51 (S11). When no person is detected in the adjacent zone, the air-conditioning operation and the ventilation operation are performed in the adjusted airflow directions. When a person is detected in the adjacent zone, the air-conditioning operation and the ventilation operation are performed in predetermined airflow directions (for example, downward directions).

When no person is detected (S1: NO), on the other hand, the indoor unit and the ventilation operation are stopped (S12). Then, determination is made whether the operation of the air-conditioning system 100 will be terminated (S4). When the operation is terminated (S4: YES), the operation of the air-conditioning system 100A is stopped and this process is terminated. When the operation is not terminated (S4: NO), on the other hand, the process returns to Step S1 and the subsequent process is repeated.

With this structure, a flow of air into the zone where no person is detected can further be reduced. As a result, the convection of air between the first zone $Z_1$ and the second zone $Z_2$ can be reduced and the power consumption reduction effect can be improved.

Further, an air curtain may separately be provided at the zone boundary $B_{12}$ to reduce the convection of air between the zones. Thus, the convection of air between the zones can further be reduced.

Further, the first air-supply quantity adjustment unit 120 and the first air-exhaust quantity adjustment unit 130 are provided in the embodiments described above, but the structure is not limited to the structure in the embodiments described above. At least one of the first air-supply port 12 and the first air-exhaust port 13 may be provided with a first air quantity adjustment unit. Similarly, at least one of the second air-supply port 22 and the second air-exhaust port 23 may be provided with a second air quantity adjustment unit. If the first air-supply port 12 and the first air-exhaust port 13 are connected to one ventilation device 200 and the second air-supply port 22 and the second air-exhaust port 23 are connected to another different ventilation device 200, the air-supply fan 203 and the air-exhaust fan 204 of the one ventilation device 200 may be used as the first air-supply quantity adjustment unit 120 and the first air-exhaust quantity adjustment unit 130, and the air-supply fan 203 and the air-exhaust fan 204 of the other ventilation device 200 may be used as the second air-supply quantity adjustment unit 220 and the second air-exhaust quantity adjustment unit 230. In this case, the air-supply quantities and the air-exhaust quantities of the air-supply ports and the air-exhaust ports are controlled by controlling the rotation frequencies of the air-supply fans 203 and the air-exhaust fans 204.

Further, in Embodiment 1, the indoor unit performs the air-sending operation when no person is detected in the zone (S3 in FIG. 5), but the air sending may be stopped. In Embodiments 2 to 4, the indoor unit in the zone is stopped when no person is detected in the zone (S12 in FIG. 11 and S21 in FIG. 15 and FIG. 17), but the air-sending operation may be performed without stopping the indoor unit. Further, in Embodiments 2 to 4, the ventilation is stopped and the ventilation air quantities are set to 0 when no person is detected in the zone (S12 in FIG. 11 and S25 in FIG. 15 and FIG. 17), but the ventilation air quantities may be reduced toward 0 without setting the ventilation air quantities to 0. Also in these cases, the flows of air are confined within each zone and power consumption can be reduced.

Although the operation flows of the air-conditioning system 100 of the embodiments described above (FIG. 5, FIG. 11, FIG. 15, and FIG. 17) are executed for each zone, the operation flows may be executed for at least one zone out of the plurality of zones. Further, in the air-conditioning system 100, the first indoor unit 11 and the second indoor unit 21 are not essential but other air-conditioning devices may be provided. A ventilation system having the first air-supply port 12, the first air-exhaust port 13, the second air-supply port 22, and the second air-exhaust port 23 may be employed instead.

REFERENCE SIGNS LIST

11 first indoor unit 12 first air-supply port 13 first air-exhaust port 14 first detection unit 21 second indoor unit 22 second air-supply port 23 second air-exhaust port 24 second detection unit 31 third indoor unit 32 third air-supply port 33 third air-exhaust port 50 controller 51 memory 52 determination unit 53 air-conditioning control unit 54 ventilation control unit 60 outdoor temperature sensor 100, 100A, 100B, 100C, 100D, 100E air-conditioning system 110 casing 111 heat exchanger 112 fan 113 air-conditioning outlet 114 air-conditioning inlet 115 airflow direction flap 120 first air-supply quantity adjustment unit 130 first air-exhaust quantity adjustment unit 150 operation unit 200 ventilation device 201 air-supply passage 202 air-exhaust passage 203 air-supply fan 204 air-exhaust fan 220 second air-supply quantity adjustment unit 230 second air-exhaust quantity adjustment unit $B_{12}$ zone boundary $B_{23}$ zone boundary R air-conditioned space $Z_1$ first zone $Z_2$ second zone $Z_3$ third zone

The invention claimed is:

1. An air-conditioning system, comprising:
   a ventilation system including
     a first air-supply port and a first air-exhaust port each disposed in a first zone and used to ventilate the first zone; and
     a second air-supply port and a second air-exhaust port each disposed in a second zone and used to ventilate the second zone, the second zone being adjacent to the first zone, wherein
     the first air-supply port, the first air-exhaust port, the second air-supply port, and the second air-exhaust port are disposed on one plane, and
     the first air-supply port, the first air-exhaust port, the second air-supply port, and the second air-exhaust port are disposed
     in order of the first air-exhaust port, the first air-supply port, the second air-supply port, and the second air-exhaust port in one direction, or
     in order of the first air-supply port, the first air-exhaust port, the second air-exhaust port, and the second air-supply port in one direction;
   a first indoor unit disposed in the first zone and configured to condition air in the first zone;
   a second indoor unit disposed in the second zone and configured to condition air in the second zone;
   a detection unit configured to detect a person in the first zone, wherein, when no person is detected in the first zone, the first indoor unit is configured to stop an operation or perform an air-sending operation;
   an air quantity adjustment unit configured to, when no person is detected in the first zone, set an air-supply quantity of the first air-supply port and an air-exhaust quantity of the first air-exhaust port to 0 or reduce the air-supply quantity and the air-exhaust quantity;
   an outdoor temperature sensor; and
   an indoor temperature sensor,
   wherein the air quantity adjustment unit is configured to avoid reducing the air-supply quantity and the air-exhaust quantity when no person is detected in the first zone, when the first indoor unit performs a cooling operation, and when an outdoor temperature detected by the outdoor temperature sensor is lower than an indoor temperature detected by the indoor temperature sensor, and
   set the air-supply quantity and the air-exhaust quantity to 0 and alternatively reduce the air-supply quantity and the air-exhaust quantity when no person is detected in the first zone and when the first indoor unit does not perform the cooling operation, or when no person is detected in the first zone and when the outdoor temperature is higher than or equal to the indoor temperature.

2. The ventilation system of claim 1, wherein
a distance between the first air-supply port and the first air-exhaust port is shorter than a distance between the first air-supply port and the second air-exhaust port, and
a distance between the second air-supply port and the second air-exhaust port is shorter than a distance between the second air-supply port and the first air-exhaust port.

3. The ventilation system of claim 1, wherein
a position of the first air-supply port in the first zone and a position of the second air-supply port in the second zone are symmetrical across a boundary between the first zone and the second zone, and
a position of the first air-exhaust port in the first zone and a position of the second air-exhaust port in the second zone are symmetrical across the boundary.

4. The air-conditioning system of claim 1, wherein the air quantity adjustment unit is configured to set the air-supply quantity and the air-exhaust quantity to a same air quantity.

5. The air-conditioning system of claim 1, further comprising an airflow-direction adjustment unit configured to make adjustment in such a manner that at least one of a supply airflow direction of the first air-supply port and a discharge airflow direction of the first air-exhaust port is deflected away from the second zone.

6. The air-conditioning system of claim 1, wherein
the first air-supply port and the first air-exhaust port are disposed opposite to each other across the first indoor unit in a direction orthogonal to a boundary between the first zone and the second zone, and
the second air-supply port and the second air-exhaust port are disposed opposite to each other across the second indoor unit in the direction orthogonal to the boundary.

7. The air-conditioning system of claim 1, wherein the air quantity adjustment unit is configured to set the air-supply quantity and the air-exhaust quantity to maximum air quantities when a person is detected in the first zone, when the first indoor unit performs the cooling operation, and when the outdoor temperature is lower than the indoor temperature.

8. The air-conditioning system of claim 7, wherein
the detection unit is configured to detect the number of people in the first zone, and
the air quantity adjustment unit is configured to set the air-supply quantity and the air-exhaust quantity to air quantities that depend on the number of people when a person is detected in the first zone and when the first indoor unit does not perform the cooling operation, or when a person is detected in the first zone and when the outdoor temperature is higher than or equal to the indoor temperature.

9. An air-conditioning system, comprising:
a ventilation system including
a first air-supply port and a first air-exhaust port each disposed in a first zone and used to ventilate the first zone; and
a second air-supply port and a second air-exhaust port each disposed in a second zone and used to ventilate the second zone, the second zone being adjacent to the first zone, wherein
the first air-supply port, the first air-exhaust port, the second air-supply port, and the second air-exhaust port are disposed on one plane, and
the first air-supply port, the first air-exhaust port, the second air-supply port, and the second air-exhaust port are disposed
in order of the first air-exhaust port, the first air-supply port, the second air-supply port, and the second air-exhaust port in one direction, or
in order of the first air-supply port, the first air-exhaust port, the second air-exhaust port, and the second air-supply port in one direction;
a first indoor unit disposed in the first zone and configured to condition air in the first zone;
a second indoor unit disposed in the second zone and configured to condition air in the second zone;
a detection unit configured to detect a person in the first zone, wherein, when no person is detected in the first zone, the first indoor unit is configured to stop an operation or perform an air-sending operation;
wherein
the detection unit is configured to detect a person in the second zone, and
the air-conditioning system further comprises an airflow-direction adjustment unit configured to,
when a person is detected in the first zone and when no person is detected in the second zone, deflect a supply airflow direction of the first air-supply port and a discharge airflow direction of the first air-exhaust port away from the second zone, and,
when a person is detected each in the first zone and in the second zone, set the supply airflow direction of the first air-supply port and the discharge airflow direction of the first air-exhaust port to downward directions.

10. The air-conditioning system of claim 9, wherein
a distance between the first air-supply port and the first air-exhaust port is shorter than a distance between the first air-supply port and the second air-exhaust port, and
a distance between the second air-supply port and the second air-exhaust port is shorter than a distance between the second air-supply port and the first air-exhaust port.

11. The air-conditioning system of claim 9, wherein
a position of the first air-supply port in the first zone and a position of the second air-supply port in the second zone are symmetrical across a boundary between the first zone and the second zone, and
a position of the first air-exhaust port in the first zone and a position of the second air-exhaust port in the second zone are symmetrical across the boundary.

12. The air-conditioning system of claim 9, wherein the airflow-direction adjustment unit is further configured to make adjustment in such a manner that at least one of the supply airflow direction of the first air-supply port and the discharge airflow direction of the first air-exhaust port is deflected away from the second zone.

13. The air-conditioning system of claim 9, wherein
the first air-supply port and the first air-exhaust port are disposed opposite to each other across the first indoor unit in a direction orthogonal to a boundary between the first zone and the second zone, and
the second air-supply port and the second air-exhaust port are disposed opposite to each other across the second indoor unit in the direction orthogonal to the boundary.

14. The air-conditioning system of claim 9, further comprising an air quantity adjustment unit configured to, when no person is detected in the first zone, set an air-supply quantity of the first air-supply port and an air-exhaust quantity of the first air-exhaust port to 0 or reduce the air-supply quantity and the air-exhaust quantity.

15. The air-conditioning system of claim 14, wherein the air quantity adjustment unit is configured to set the air-supply quantity and the air-exhaust quantity to maximum air quantities when a person is detected in the first zone, when the first indoor unit performs the cooling operation, and when the outdoor temperature is lower than the indoor temperature.

16. The air-conditioning system of claim 15, wherein
the detection unit is configured to detect the number of people in the first zone, and
the air quantity adjustment unit is configured to set the air-supply quantity and the air-exhaust quantity to air quantities that depend on the number of people when a person is detected in the first zone and when the first indoor unit does not perform the cooling operation, or when a person is detected in the first zone and when the outdoor temperature is higher than or equal to the indoor temperature.

17. The air-conditioning system of claim 14, wherein the air quantity adjustment unit is configured to set the air-supply quantity and the air-exhaust quantity to a same air quantity.

* * * * *